(12) United States Patent
McAlpine et al.

(10) Patent No.: US 10,559,208 B1
(45) Date of Patent: Feb. 11, 2020

(54) SYSTEM AND METHOD FOR CONTROLLING REPORTING FREQUENCY

(71) Applicant: Caterpillar Paving Products Inc., Brooklyn Park, MN (US)

(72) Inventors: Jacob J. McAlpine, Otsego, MN (US); Nicholas A. Oetken, Brooklyn Park, MN (US); Dann J. Rawls, Dunlap, IL (US)

(73) Assignee: Caterpillar Paving Products Inc, Brooklyn Park, MN (US)

( * ) Notice: Subject to any disclaimer, the term of this patent is extended or adjusted under 35 U.S.C. 154(b) by 0 days.

(21) Appl. No.: 16/257,827

(22) Filed: Jan. 25, 2019

(51) Int. Cl.
| | |
|---|---|
| *H04W 4/40* | (2018.01) |
| *G08G 1/00* | (2006.01) |
| *H04W 4/021* | (2018.01) |
| *E01C 19/22* | (2006.01) |
| *E01C 19/00* | (2006.01) |

(52) U.S. Cl.
CPC ............ *G08G 1/20* (2013.01); *E01C 19/004* (2013.01); *E01C 19/22* (2013.01); *H04W 4/021* (2013.01); *H04W 4/40* (2018.02)

(58) Field of Classification Search
CPC .......... G01G 1/20; H04W 4/40; H04W 4/021; E01C 19/004; E01C 19/22; E01C 19/00; E01C 19/002; E01C 19/02; E01C 19/12; E01C 19/45; E01C 19/46; E01C 19/48; E01C 19/50; E01C 19/52; E01C 19/006; E01C 19/008; E01C 19/42; E01C 23/01; E01C 23/07; G01B 11/0608; G01B 11/245; G01B 17/06; G01B 5/0014; G01C 7/04; G01S 15/88; G01S 7/52006
See application file for complete search history.

(56) References Cited

U.S. PATENT DOCUMENTS

| | | |
|---|---|---|
| 7,606,579 B2 | 10/2009 | Thacher |
| 8,121,619 B1 | 2/2012 | Ghosh et al. |
| 8,825,369 B2 | 9/2014 | Jin |

(Continued)

FOREIGN PATENT DOCUMENTS

| | | |
|---|---|---|
| CN | 1851497 | 10/2006 |
| CN | 101210960 | 7/2008 |
| CN | 105353395 | 2/2016 |

*Primary Examiner* — Hai Phan
*Assistant Examiner* — Anthony D Afrifa-Kyei
(74) *Attorney, Agent, or Firm* — Lee & Hayes, PLLC

(57) ABSTRACT

A method includes receiving first location information at a first reporting frequency, the first location information being generated by a location sensor and indicating a first location of a paving system component. The method also includes determining that a distance between a second location of the paving system component and a first geofence is less than or equal to a distance threshold. The method further includes controlling the location sensor to provide second location information at the first reporting frequency, and receiving third location information at the first reporting frequency. In such a method, the third location information indicates a third location of the paving system component. The method also includes determining that the third location is within the first geofence, and controlling the location sensor to provide fourth location information at a second reporting frequency greater than the first reporting frequency.

20 Claims, 3 Drawing Sheets

(56) References Cited

U.S. PATENT DOCUMENTS

2013/0103271 A1* 4/2013 Best .................. G06F 19/00
 701/50
2013/0290062 A1* 10/2013 Patel ............... G06Q 10/06313
 705/7.23
2019/0188620 A1* 6/2019 Marsolek ......... G06Q 10/06315

* cited by examiner

US 10,559,208 B1

SYSTEM AND METHOD FOR CONTROLLING REPORTING FREQUENCY

TECHNICAL FIELD

The present disclosure relates to a paving system. More specifically, the present disclosure relates to a paving system including a control system configured to actively modify the frequency at which location information is reported.

BACKGROUND

Haul trucks, paving machines, compaction machines, and other paving system components are often used to perform a variety of tasks associated with a worksite. For example, one or more haul trucks may be used to transport paving material from a paving material plant to a worksite so that the paving material can be distributed along a work surface of the worksite by one or more paving machines. One or more compaction machines may follow behind the paving machine, and may be operable to compact the freshly-laid paving material to a desired density or stiffness. The operation of such machines must be coordinated in order to perform paving operations in an efficient manner. However, due to the large number of haul trucks, compaction machines, paving machines, and other paving system components associated with a typical paving project, and the dynamic nature of such paving system components, management of such paving projects can be challenging. For instance, paving material plants are often located remote from the worksite. Due to the distance between the paving material plant and the worksite, and the variables (e.g., traffic, weather, alternate haul routes, road conditions, paving material plant delays, etc.) associated with transporting paving material from the paving material plant to the worksite, it can be difficult to manage the delivery of paving material to the worksite accurately. For instance, it can be difficult to accurately determine the location of a haul truck as the haul truck travels along a travel path between the paving material plant and the worksite.

An example system for coordinating the activities of paving machines is described in U.S. Patent Application Publication No. 2013/0290062 (hereinafter referred to as the '062 reference). In particular, the '062 reference describes a system for implementing a computer-based method of coordinating activities associated with paving a roadway. The '062 reference describes, for example, a server configured to provide communication among system components. As explained in the '062 reference, the server may receive a communication from a transport truck indicating that a batch of paving material has been delivered to the roadway, and such a communication may be generated automatically by a truck computer system in conjunction with a global positioning system (GPS) receiver on the truck.

The '062 reference does not, however, describe a system that is configured to actively adjust the frequency at which location information is provided to the server based on truck speed, truck distance to the worksite, an expected travel time associated with the truck traveling to the worksite, the size and/or proximity of the truck to one or more geofences associated with the worksite, or other factors. Instead, location information may be unnecessarily provided to the server at a relatively high default reporting frequency when the transport truck is located far from the worksite. As a result, such information may either go unused, or may undesirably consume network bandwidth, memory, and/or processor resources when highly accurate determinations of transport truck location are not required. Additionally, while the transport truck is located at or near the worksite or other areas of interest, such a default reporting frequency may actually be lower than desired. For instance, providing location information at the default reporting frequency may result in too little location information being provided while the transport truck travels proximate a paving machine and various other machines at the worksite. As a result, the efficiency of the paving system described in the '062 reference may suffer.

Example embodiments of the present disclosure are directed toward overcoming the deficiencies described above.

SUMMARY

In an example embodiment of the present disclosure, a method includes receiving first location information, at a first reporting frequency, with a controller, the first location information being generated by a location sensor and indicating a first location of a paving system component. The method also includes determining that a distance between a second location of the paving system component and a first geofence is less than or equal to a distance threshold, and based at least in part on determining that the distance is less than or equal to the distance threshold, controlling the location sensor to provide second location information at the first reporting frequency. The method further includes receiving third location information, at the first reporting frequency, with the controller, the third location information being generated by the location sensor and indicating a third location of the paving system component. The method also includes determining, based at least in part on the third location information, that the third location of the paving system component is within the first geofence. Additionally, the method includes based at least in part on determining that the third location is within the first geofence, controlling the location sensor to provide fourth location information at a second reporting frequency greater than the first reporting frequency.

In another example embodiment of the present disclosure, a method includes selecting, with a controller, a first reporting frequency of a location sensor disposed on a haul truck, and receiving first location information, at the first reporting frequency, with the controller, the first location information being generated by the location sensor and indicating a first location of the haul truck, wherein the first location is disposed along a travel path extending from a paving material plant to a worksite remote from the paving material plant. The method also includes selecting, with the controller, a second reporting frequency of the location sensor based on at least one of a first distance between the first location and a first geofence associated with the worksite, an expected travel time associated with the haul truck traveling from the first location to the first geofence, or a speed of the haul truck at the first location, the second reporting frequency being less than the first reporting frequency. The method also includes receiving second location information, at the second reporting frequency, with the controller, the second location information being generated by the location sensor and indicating a second location of the haul truck along the travel path, wherein a second distance between the second location and the first geofence is less than or equal to a distance threshold. The method further includes controlling the location sensor to provide third location information at the first reporting frequency based at least in part on the second distance and receiving the third location information, at the first reporting frequency, with the controller, the third location information being generated by the location sensor and indicating a third location of the haul truck. In such a method, the third location of the haul truck is within the first geofence. The method also includes based at least in part on the third location, controlling the location sensor to provide fourth location information at a third reporting frequency greater than the first reporting frequency.

In yet another example embodiment of the present disclosure, a paving system includes a controller, a haul truck configured to transport paving material from a paving material plant to a worksite remote from the paving material plant, and a location sensor disposed on the haul truck and configured to determine a location of the haul truck, wherein the location sensor is in communication with the controller via a network. The paving system also includes a paving machine disposed at the worksite and configured to receive paving material from the haul truck. In such a paving system, the controller is configured to receive first location information, via the network and at a first reporting frequency, from the location sensor, the first location information indicating a first location of the haul truck, wherein the first location is disposed along a travel path extending from the paving material plant to the worksite. The controller is also configured to select a second reporting frequency of the location sensor. The second reporting frequency is based at least in part on at least one of a first distance between the first location and a first geofence associated with the worksite, an expected travel time associated with the haul truck traveling from the first location to the first geofence, or a speed of the haul truck at the first location, the second reporting frequency being less than the first reporting frequency. The controller is further configured to control the location sensor to provide second location information at the second reporting frequency, and receive the second location information, via the network and at the second reporting frequency, from the location sensor, the second location information indicating a second location of the haul truck along the travel path, wherein a second distance between the second location and the first geofence is less than or equal to a distance threshold. The controller is further configured to control the location sensor to provide third location information at the first reporting frequency based at least in part on the second distance, and to receive the third location information, via the network and at the first reporting frequency, from the location sensor, the third location information indicating a third location of the haul truck, wherein the third location of the haul truck is within the first geofence. The controller is also configured to, based at least in part on the third location, control the location sensor to provide fourth location information at a third reporting frequency greater than the first reporting frequency.

DETAILED DESCRIPTION

Figure 1:
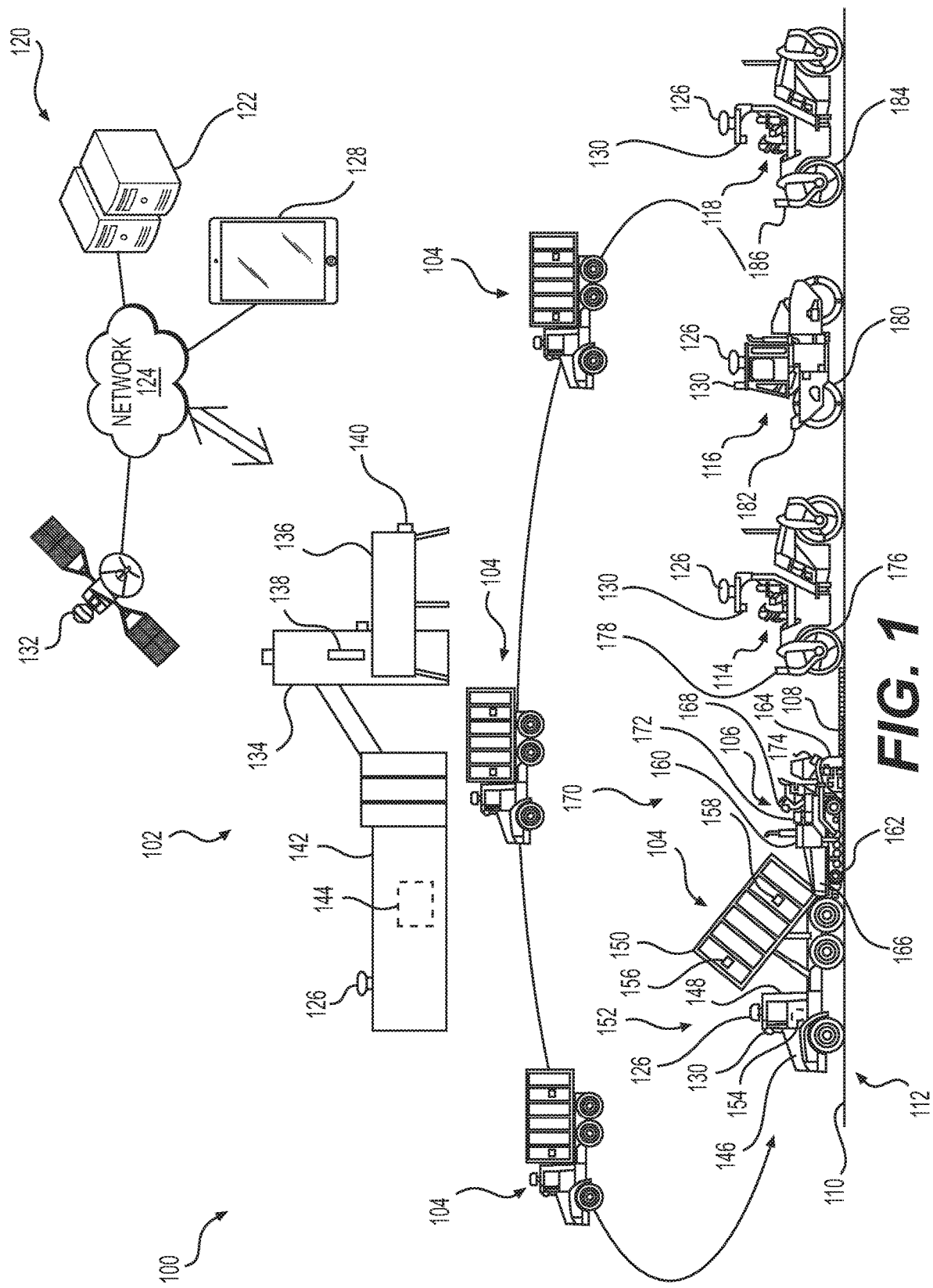
FIG. 1 is a schematic illustration of a paving system according to an example embodiment of the present disclosure.

Wherever possible, the same reference numbers will be used throughout the drawings to refer to the same or like parts. Referring to FIG. 1, an example paving system 100 may include one or more paving material plants 102, and a plurality of machines such as one or more haul trucks 104 and/or one or more paving machines 106. For example, the paving material plant 102 may include various equipment configured to heat, produce, sense, store, and/or transfer paving material 108 such as asphalt. For instance, one or more haul trucks 104 may be loaded with a desired amount of paving material 108 at the paving material plant 102. The one or more haul trucks 104 may be configured to travel along various travel paths extending from the paving material plant 102 to, for example, a work surface 110 of a worksite 112, and/or to the worksite 112 generally. Such travel paths may include one or more partially or completely formed roads, highways, bridges, service roads, or other surfaces passable by construction and/or paving machines, and such an example worksite 112 may include, for example, a construction site, a roadworksite, a parking lot, or any other type of job site. Once a haul truck 104 has delivered the paving material 108 to the worksite 112, the haul truck 104 may transfer the paving material 108 to a hopper or other component of the paving machine 106, and the paving machine 106 may apply the paving material 108 to and/or otherwise deposit the paving material 108 on the work surface 110 in the form of a substantially flat, substantially smooth paving material mat. The paving system 100 may also include one or more other machines, such as one or more compaction machines 114, 116, 118, one or more cold planers or other excavation machines (not shown), and/or one or more remixing transfer vehicles (not shown). In such examples, the one or more compaction machines 114, 116, 118 may be configured to compact the mat of paving material 108 to a desired density. It is understood that the overall efficiency of the paving system 100 may be maximized when the haul trucks 104, paving machine 106, compaction machines 114, 116, 118 and/or other components of the paving system 100 are operating at optimal speeds and without stoppages caused by delays in paving material production, delays in paving material delivery, inadequate paving system resources, etc. Accordingly, in order to maximize the efficiency of the paving system 100, embodiments of the present disclosure may be used to provide project managers with the ability to determine which paving project a particular paving system component is associated with, and whether a particular paving system component is currently active. Operating the paving system 100 based on and/or in view of such information may improve the overall efficiency of the paving system 100, and may maximize the quality of the mat of paving material being formed by the paving system 100.

In example embodiments, the paving material plant 102 may produce paving material 108 such as asphalt from bitumen, aggregate, and other materials or fillers. The paving material 108 is often produced in batches with each batch stored or held in a separate storage or holding location, such as a silo, until it is loaded into a haul truck 104 at a loading station. Each holding location may be dedicated to storing or holding paving material 108 for a particular worksite 112 and paving material 108 within a particular holding location is periodically loaded into a haul truck 104 for transport to the worksite 112. The characteristics of each batch stored within a holding location may be set based upon the desired characteristics for a particular paving job. For example, the amount of oil and the size of the aggregate may be set based upon the desired characteristics of the paving material 108 and the requirements of each paving job.

Each batch of paving material may be periodically or continuously mixed at the holding location and maintained at a desired temperature. The temperature at which the paving material 108 is maintained may be set based upon a desired temperature at which the paving material 108 will be loaded into the haul trucks 104. Such loading temperature may be based upon the desired temperature at which the load will be delivered to the paving machine 106, the ambient temperature of the air, the expected time required for the haul truck 104 to drive from the paving material plant 102 to the paving machine 106, as well as any expected or anticipated waiting time for the haul 104 truck at the worksite 112.

The paving system 100 shown in FIG. 1 may also include a control system 120 and one or more system controllers 122. In some examples, the control system 120 and/or the system controller 122 may be located at the paving material plant 102. In such examples, the control system 120 and/or the system controller 122 may also include components located remotely from the paving material plant 102 such as on or in any of the machines of the paving system 100, at the worksite 112, and/or at a remote command center (not shown). In other examples, the control system 120 and/or the system controller 122 may be located remote from the paving material plant 102 and/or remoter from the worksite 112, such as at the remote command center referred to above. In any of the examples described herein, the functionality of system controller 122 may be distributed so that certain operations are performed at the paving material plant 102 and other operations are performed remotely. For example, some operations of the system controller 122 may be performed at the worksite 112, on one or more of the haul trucks 104, on one or more of the paving machines 106, etc. It is understood that the system controller 122 may comprise a component of the paving system 100, the paving material plant 102, one or more of the haul trucks 104, one or more of the paving machines 106, one or more of the compaction machines 114, 116, 118, a component of a separate mobile device (e.g., a mobile phone, a tablet, a laptop computer, etc.), and/or the control system 120.

The system controller 122 (sometimes referred to herein as "controller") may be an electronic controller that operates in a logical fashion to perform operations, execute control algorithms, store and retrieve data and other desired operations. The system controller 122 may include or access memory, secondary storage devices, processors, and any other components for running an application. The memory and secondary storage devices may be in the form of read-only memory (ROM) or random access memory (RAM) or integrated circuitry that is accessible by the system controller 122, that is operably connected to the system controller 122, and/or that is otherwise associated with the system controller 122. Various other circuits may be associated with the system controller 122 such as power supply circuitry, signal conditioning circuitry, driver circuitry, and other types of circuitry.

The system controller 122 may comprise a single controller or may include more than one controller (such as additional controllers associated with one or more of the haul trucks 104, paving machines 106, compaction machines 114, 116, 118, cold planers (not shown), and/or other machines of the paving system 100) configured to control various functions and/or features of the paving system 100. As used herein, the term "controller" is meant in its broadest sense to include one or more controllers, processors, microprocessors, and/or other data processing and/or computing components that may be associated with the paving system 100, and that may cooperate in controlling various functions and operations of the paving material plant 102 and the machines of the paving system 100. The functionality of the system controller 122 may be implemented in hardware and/or software without regard to the functionality. The system controller 122 may rely on one or more data maps relating to the operating conditions and the operating environment of the paving system 100 that may be stored in the memory of the system controller 122. Each of these data maps may include a collection of data in the form of tables, graphs, and/or equations to maximize the performance and efficiency of the paving system 100 and its operation. As will be described below, the system controller 122 may be configured to perform one or more processes associated with the method shown in FIG. 3.

The components of the control system 120 may be in communication with and/or otherwise operably connected to any of the components of the paving system 100 via a network 124. The network 124 may be a local area network ("LAN"), a larger network such as a wide area network ("WAN"), or a collection of networks, such as the Internet. Protocols for network communication (e.g., wireless machine-to-machine communication protocols), such as TCP/IP, may be used to implement the network 124. Although embodiments are described herein as using a network 124 such as the Internet, other distribution techniques may be implemented that transmit information via memory cards, flash memory, or other portable memory devices.

It is also understood that the paving material plant 102, the various haul trucks 104, paving machines 106, compaction machines 114, 116, 118 and/or other components of the paving system 100 may include respective controllers, and each of the respective controllers may be in communication and/or may otherwise be operably connected via the network 124. For example, the network 124 may comprise a component of a wireless communication system of the paving system 100, and as part of such a wireless communication system, the paving material plant 102, the one or more haul trucks 104, the paving machine 106, the one or more compaction machines 114, 116, 116, and/or other components of the paving system 100 may include respective communication devices 126. Such communication devices 126 may be configured to permit wireless transmission of a plurality of signals, instructions, and/or information between the paving material plant 102, the haul trucks 104, the paving machines 106, the compaction machines 114, 116, 118, and the system controller 122, as well as to permit communication with other machines and systems remote from the paving material plant 102, haul trucks 104, paving machines 106, compaction machines 114, 116, 118, and/or the worksite 112. For example, such communication devices 126 may include a transmitter configured to transmit signals to a receiver of one or more other such communication devices 126. In such examples, each communication device 126 may also include a receiver configured to receive such signals. In some examples, the transmitter and the receiver of a particular communication device 126 may be combined as a transceiver or other such component. In any of the examples described herein, such communication devices 126 may also enable communication with one or more tablets, computers, cellular/wireless telephones, personal digital assistants, mobile devices, telematics devices, or other electronic devices 128 located at the worksite 112, at the paving material plant 102, and/or remote from the worksite 112 or the paving material plant 102. Such electronic devices 128 may comprise, for example, mobile phones and/or tablets of project managers (e.g., foremen) overseeing daily paving operations at the worksite 112 and/or at the paving material plant 102.

The network 124, communication devices 126, and/or other components of the wireless communication system described above may implement or utilize any desired system or protocol including any of a plurality of communications standards. The desired protocols will permit wireless communication between the system controller 122, one or more of the communication devices 126, and/or any other desired machines or components of the paving system 100. Examples of wireless communications systems or wireless machine-to-machine communication protocols that may be used by the paving system 100 described herein include a wireless personal area network such as Bluetooth® (e.g., IEEE 802.15), a local area network such as IEEE 802.11b or 802.11g, a cellular network, radio frequency identification ("RFID") or any other system or protocol for data transfer. Other wireless communication systems and/or wireless machine-to-machine communication protocols are contemplated. In some instances, wireless communications may be transmitted and received directly between the control system 120 and a machine (e.g., a paving machine 106, a haul truck 104, etc.) of the paving system 100 or between such machines. In other instances, the communications may be automatically routed without the need for re-transmission by remote personnel.

In example embodiments, one or more machines of the paving system 100 (e.g., the one or more haul trucks 104, the paving machine 106, the one or more compaction machines 114, 116, 118, etc.) may include a location sensor 130 configured to determine a location and/or orientation of the respective machine. In such embodiments, the communication device 126 of the respective machine may be configured to generate and/or transmit signals indicative of such determined locations and/or orientations to, for example, the system controller 122 and/or to the other respective machines of the paving system 100. In some examples, the location sensors 130 of the respective machines may include and/or comprise a component of global navigation satellite system (GNSS) or a global positioning system (GPS). Alternatively, universal total stations (UTS) may be utilized to locate respective positions of the machines. In example embodiments, one or more of the location sensors 130 described herein may comprise a GPS receiver, transmitter, transceiver, laser prisms, and/or other such device, and the location sensor 130 may be in communication with one or more GPS satellites 132 and/or UTS to determine a respective location of the machine to which the location sensor 130 is connected continuously, substantially continuously, or at various time intervals. One or more additional machines of the paving system 100 may also be in communication with the one or more GPS satellites 132 and/or UTS, and such GPS satellites 132 and/or UTS may also be configured to determine respective locations of such additional machines. In any of the examples described herein, machine locations determined by the respective location sensors 130 may be used by the system controller 122 and/or other components of the paving system 100 to coordinate activities of the haul trucks 104, paving machine 106, compaction machines 114, 116, 118, and/or other components of the paving system 100. For example, as will be described with respect to at least FIG. 3, machine locations determined by the respective location sensors 130 may be used by the system controller 122 and/or other components of the paving system 100 to actively modify, maintain, and/or otherwise control a reporting frequency of the various location sensors 130. As a result, such information and processes may be used to improve the overall efficiency of the paving system 100.

With continued reference to FIG. 1, the paving material plant 102 may include various material delivery components, mixers, heaters, and/or other equipment configured to assist in manufacturing paving material 108 for use in various paving operations. Such equipment may include, for example, one or more conveyors or other devices configured to transport paving material 108 to one or more paving material silos 134 or other holding locations for storage therein. The paving material plant 102 may also include one or more load stations 136 configured to transfer paving material 108 from the one or more paving material silos 134 to a haul truck 104. In such examples, a paving material silo 134 may include one or more sensors 138 configured to determine a temperature of paving material 108 stored within the paving material silo 134 and/or an amount of paving material 108 stored within the paving material silo 134 (e.g., a fill level of the paving material silo 134). Similarly, a load station 136 may include one or more sensors 140 configured to determine the presence and/or location of a haul truck 104, a time at which the haul truck 104 arrived at the load station 136, a time at which the haul truck 104 departed the load station 136, an amount (e.g., a weight) of paving material 108 loaded into the haul truck 104, and/or other operating parameters. In some examples, the sensor 140 may comprise a scale or other mass sensor configured to determine the weight of the haul truck 104 upon entering the load station 136, the weight of the haul truck 104 after paving material has been loaded into the haul truck 104, and/or a change in weight of the haul truck 104.

The paving material plant 102 may also include one or more scale houses, operator stations, or other stations 142 for use by paving material plant personnel. For example, as shown in phantom in FIG. 1, one or more such stations 142 may include a paving material plant controller 144 that is substantially similar to and/or the same as the system controller 122 described above. In some examples, the paving material plant controller 144 may comprise a component of the control system 120. In any of the examples described herein, the paving material plant controller 144 and/or other components of the paving material plant 102 may be configured to monitor, record, and/or communicate activities of the various haul trucks 104 entering and leaving the paving material plant 102. For example, the various sensors of the paving material plant 102 and/or the paving material plant controller 144 may monitor, sense, determine, record, and/or transmit information indicative of a time at which a particular haul truck 104 enters the paving material plant 102, a time at which the haul truck 104 leaves the paving material plant 102, the amount of paving material 108 loaded into the particular departing haul truck 104, the destination of the particular haul truck 104 (e.g., the location of the worksite 112), the operator of the haul truck 104, a project identifier uniquely identifying a particular paving project with which the paving material 108 loaded into the haul truck 104 is associated, an asset identifier (e.g., a license plate number) uniquely identifying the haul truck 104, a source identifier (e.g., a name and/or location of the paving material plant 102) uniquely identifying the paving material plant 102, and/or other information. Such information may be used by, for example, the system controller 122 in any of the operations described herein. As will be described below, such information may also be included in one or more paving material tickets generated at the paving material plant 102.

As noted above, the haul trucks 104 of the paving system 100 may be operative to transport paving material 108 between the paving material plant 102 and one or more of the paving machines 106 located at the worksite 112. Each haul truck 104 may include a chassis 146 that supports a prime mover, such as an engine, and a cab 148 in which an operator may be positioned to provide input instructions to operate the haul truck 104. The engine is operatively connected to and drives a ground engaging drive mechanism such as wheels. A material transport unit such as a dump body 150 is pivotally mounted on the chassis 146 and receives a payload (e.g., paving material 108) to be hauled from one location to another.

Each haul truck 104 may include a truck control system 152 and a truck controller 154 generally similar or identical to the control system 120 and the system controller 122, respectively. The truck control system 152 and the truck controller 154 may be located on the haul truck 104 and may also include components located remotely from the haul truck 104 such as on any of the other machines of the paving system 100, at the paving material plant 102, or at a command center (not shown). The functionality of truck controller 154 may be distributed so that certain functions are performed on the haul truck 104 and other functions are performed remotely. In some examples, the truck control system 152 and/or the truck controller 154 may enable autonomous and/or semi-autonomous control of the haul truck 104.

The haul truck 104 may also be equipped with a plurality sensors connected to and/or otherwise in communication with the truck controller 154 and/or with the system controller 122. Such sensors may be configured to provide data indicative (directly or indirectly) of various operating parameters of the haul truck 104, systems associated with the haul truck 104, and/or the worksite 112 and/or other environment in which the haul truck 104 is operating. In any of the examples described herein, such sensors may comprise components of the truck control system 152, the control system 120, and/or the paving system 100, generally. For example, as noted above, the haul truck 104 may be equipped with a location sensor 130 configured to sense, detect, and/or otherwise determine a location and/or orientation of the haul truck 104. The location sensor 138 may include a plurality of individual sensors that cooperate to generate and provide location signals to the truck controller 154 and/or to the system controller 122 indicative of the location and/or orientation of the haul truck 104. In some examples, the location sensor 130 may be fixed to the cab 148, the chassis 146, and/or any other component of the haul truck 104. In other examples, however, the location sensor 130 may be removably attached to the haul truck 104 and/or disposed within, for example, the cab 148 of the haul truck 104 during operation of the haul truck 104. In some examples, the haul truck 104 may also include a load sensor 156 configured to sense, measure, and/or otherwise determine the load or amount of paving material 108 disposed within the dump body 150. The haul truck 104 may further include a temperature sensor 158 configured to sense, measure, and/or otherwise determine the temperature of the load (e.g., paving material 108) within the dump body 150.

The paving machine 106 may include a frame 160 having a set of ground engaging wheels or tracks 162 mounted thereto, as well as a screed 164 for spreading paving material 108 across a width of the work surface 110. The paving machine 106 may further include a hopper 166 for storing paving material 108 supplied by the haul truck 104 or another supply machine, and a conveyor system which transfers paving material 108 from the hopper 166 to the screed 164. The paving machine 106 may further include a display 168, such as a liquid crystal display (LCD) device. The display 168 may be mounted to the frame 160 for viewing by an operator. In an example embodiment, the display 168 may be configured to display a map of the worksite 112 including icons or other visual indicia representing the work surface 110, the paving machine 106, the haul truck 104, one or more of the compaction machines 114, 116, 118, and/or other components of the paving system 100. The display 168 may also be configured to display a map The paving machine 106 may also include a paving machine control system 170 and a paving machine controller 172 generally similar or identical to the control system 120 and the system controller 122, respectively. The paving machine control system 170 and the paving machine controller 172 may be located on the paving machine 106 and may also include components located remotely from the paving machine 106 such as on any of the other machines of the paving system 100, at the paving material plant 102, or at a command center (not shown). The functionality of paving machine controller 172 may be distributed so that certain functions are performed on the paving machine 106 and other functions are performed remotely. In some examples, the paving machine control system 170 and/or the paving machine controller 172 may enable autonomous and/or semi-autonomous control of the paving machine 106. For example, the paving machine controller 172 may be configured to receive one or more paving machine speeds (e.g., one or more desired paving machine speeds) from the system controller 122. In an autonomous or semi-autonomous mode of operation, the paving machine controller 172 and/or the paving machine control system 170, generally, may be operable to cause the paving machine 106 to travel at one or more of the received paving machine speeds while depositing paving material 108 on the work surface 110 in accordance with parameters (e.g., a thickness, a width, etc.) a paving plan.

The paving machine 106 may also be equipped with a plurality sensors connected to and/or otherwise in communication with the paving machine controller 172 and/or with the system controller 122. Such sensors may be configured to provide data indicative (directly or indirectly) of various operating parameters of the paving machine 106, systems associated with the paving machine 106, and/or the worksite 112, and/or other environments in which the paving machine 106 is operating. In any of the examples described herein, such sensors may comprise components of the paving machine control system 170, the control system 120, and/or the paving system 100, generally. For example, in addition to the location sensor 130 and communication device 126 described above, the paving machine 106 may also include a temperature sensor 174 mounted, for example, on or proximate the screed 164. The temperature sensor 174 may be positioned and/or otherwise configured to determine the temperature of the mat of paving material 108 deposited on the work surface 110 by the screed 164. In some examples, the temperature sensor 174 may comprise an optical temperature sensor such as an infrared camera, whereas in other embodiments the temperature sensor 174 may comprise a non-optical sensor such as a digital or analog thermometer. While the temperature sensor 174 is shown mounted on the screed 164 such that it can determine the temperature of paving material 108 deposited on the work surface 110 and located behind the screed 164 as paving progresses, the present disclosure is not limited to this configuration. For example, in other embodiments the temperature sensor 174 may be mounted at a different location on the paving machine 106, and may be configured to sense paving material temperature within paving machine 106.

As noted above, the paving system 100 may include one or more compaction machines 114, 116, 118 configured to compact the mat of paving material 108 deposited by the paving machine 106. In some examples, the compaction machine 114 may comprise a "breakdown" compactor having a breakdown drum 176, and the compaction machine 114 may be configured to follow relatively closely behind the paving machine 106, such that the breakdown drum 176 can compact paving material 108 distributed by the paving machine 106 while the paving material 108 is still relatively hot. Compacting with the compaction machine 114 when the paving material 108 is still relatively hot allows the breakdown drum 176 of the compaction machine 114 to perform a relatively large proportion of the total compaction desired for a particular lift of paving material 108, as relatively hotter asphalt in the paving material 108 can flow relatively readily and is thus readily compacted. In an example embodiment, the compaction machine 114 may be used primarily to compact paving material 108 which has not yet cooled to a "tender zone" temperature range. In such an example, the "tender zone" is a temperature range at which the paving material 108 moves or shoves in front of the advancing compaction machine drum (e.g., the breakdown drum 176), making attempted compaction generally undesirable. The actual temperature range at which the paving material 108 will be within the tender zone will depend upon the particular paving material mix, and in some examples, the paving material 108 may enter the tender zone when the temperature is between about 115 degrees Celsius and about 135 degrees Celsius. In some examples, paving material 108 may be below the tender zone when its temperature falls to between about 65 degrees Celsius and about 95 degrees Celsius. Accordingly, it will typically be desirable to compact paving material 108 with the compaction machine 114 when the temperature is above this range.

In addition to the communication device 126 and the location sensor 130 described above, the compaction machine 114 may further include any number of additional sensors configured to assist the compaction machine 114 in performing various paving (e.g., compaction) tasks. For example, such sensors may include one or more accelerometers or vibration sensors configured to sense the level of vibration (e.g., impacts per foot) imparted by the breakdown drum 176. The compaction machine 114 may also include a temperature sensor 178 mounted thereon and configured to sense, measure, and/or otherwise determine a temperature of the paving material 108 with which the compaction machine 114 is interacting or with which it has interacted. In some examples, the temperature sensor 178 may be substantially similar to and/or the same as the temperature sensor 174 of the paving machine 106.

The compaction machine 116 may be substantially similar to and/or the same as the compaction machine 114. In some examples, the compaction machine 116 may comprise an "intermediate" compactor, and may include an intermediate drum 180 which compacts paving material 108 already compacted at least once by the compaction machine 114. It will typically be desirable to compact paving material 108 with the compaction machine 116 after the paving material 108 has cooled to a temperature below the tender zone. The compaction machine 116 may include a sensor or other device configured to sense a smoothness and/or stiffness of the paving material 108. Additionally, the compaction machine 116 may include the communication device 126 and the location sensor 130 described above, as well as any number of additional sensors configured to assist the compaction machine 116 in performing various paving (e.g., compaction) tasks. For example, such sensors may include one or more accelerometers or vibration sensors configured to sense the level of vibration (e.g., impacts per foot) imparted by the intermediate drum 180. The compaction machine 116 may also include a temperature sensor 182 mounted thereon and configured to sense, measure, and/or otherwise determine a temperature of the paving material 108 with which the compaction machine 116 is interacting or with which it has interacted. In some examples, the temperature sensor 182 may be substantially similar to and/or the same as the temperature sensor 174 of the paving machine 106.

The compaction machine 118 may also be substantially similar to and/or the same as the compaction machine 114. In some examples, the compaction machine 118 may comprise a "finishing" compactor, and may include a finish drum 184 configured to perform a final squeeze of the paving material 108. In such examples, the compaction machine 118 may be configured to follow relatively closely behind compaction machine 116. In some instances, it will be desirable to compact paving material 108 with the compaction machine 118 prior to its cooling below a temperature in the range of about 50 degrees Celsius to about 65 degrees Celsius. Even where the paving material 108 is compacted to a specified relative compaction state, if compaction takes place at too low of a temperature, the aggregate in the paving material 108 may crack, creating voids which can negatively impact the long term viability of the compacted surface. To this end, the compaction machine 118 may also include a temperature sensor 186 to verify whether the final compaction is taking place at an appropriate paving material temperature. As noted above with respect to the compaction machines 114, 116, the compaction machine 118 may also include a communication device 126 and a location sensor 130, as well as any number of additional sensors configured to assist the compaction machine 118 in performing various paving (e.g., compaction) tasks. For example, such sensors may include one or more accelerometers or vibration sensors.

Figure 2:
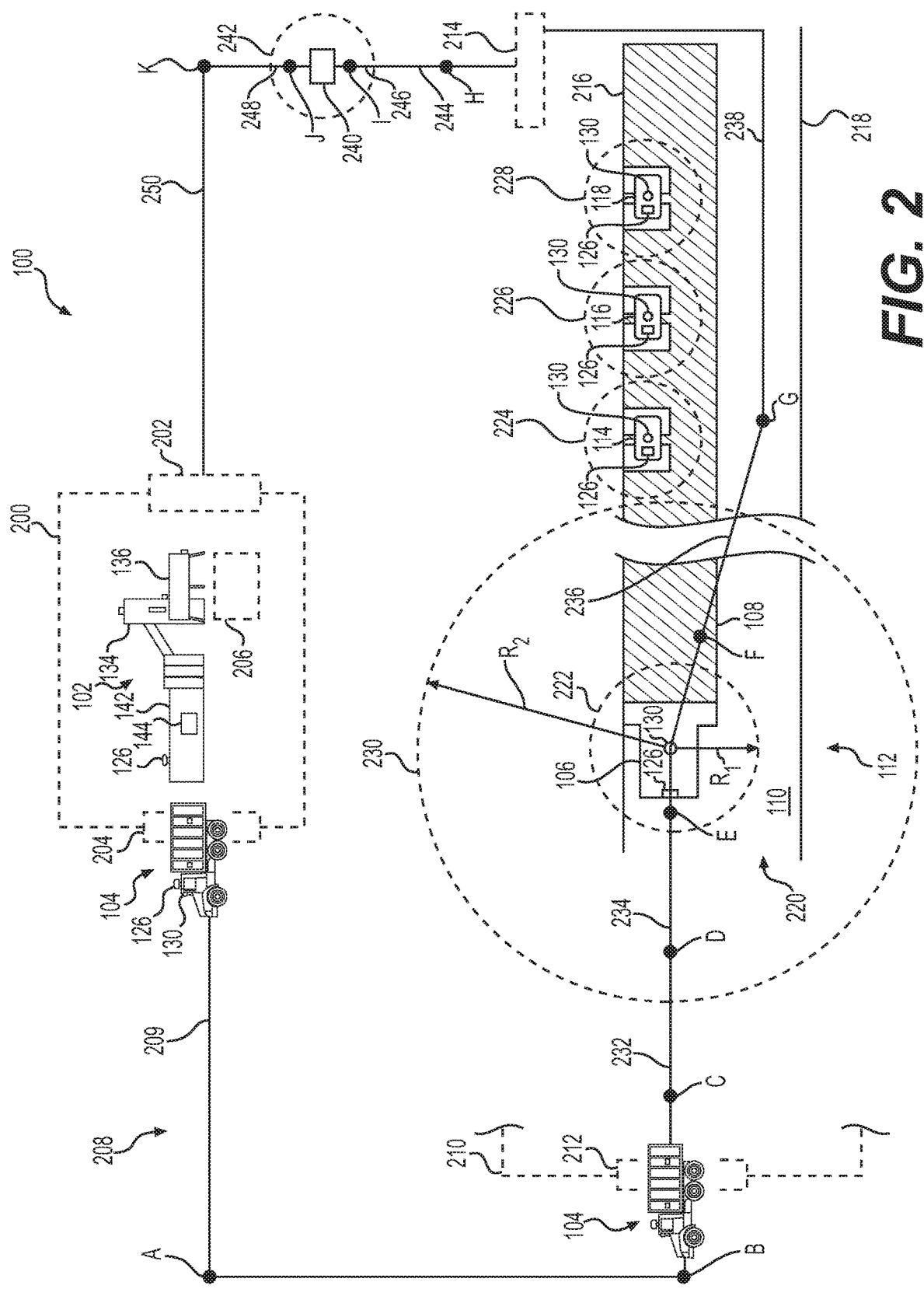
FIG. 2 is a schematic illustration of an example paving material plant and an example worksite at which one or more components of the paving system shown in FIG. 1 may be utilized.

FIG. 2 is an example schematic diagram illustrating various components of the paving system 100 performing respective paving operations. For example, FIG. 2 illustrates a paving machine 106 depositing paving material 108 onto the work surface 110 of the worksite 112. In particular, FIG. 2 illustrates the paving machine 106 depositing a mat of paving material 108 within a first boundary 216 (e.g., a right-hand side boundary) and a second boundary 218 (e.g., a left-hand side boundary) of a cut area 220 forming the work surface 110. In such examples, the cut area 220 may be formed by one or more cold planers or other excavation machines (not shown). In such examples, the cold planer or other excavation machines may act on a roadway or other paved surface of the worksite 112 to form the work surface 110 prior to the paving machine 106 depositing paving material 108 onto the work surface 110. The cut area 220 may have any desirable depth (in a direction into the page), and the paving machine 106 may be configured to deposit a mat of paving material 108 having a thickness (in a direction into the page) that is greater than or equal to the depth of the cut area 220.

As noted above, example paving systems 100 of the present disclosure, and in some examples, the control system 120 of the paving system 100, may be used to detect, determine, monitor, coordinate, and/or facilitate various operations of the haul truck 104, the paving machine 106, the compaction machines 114, 116, 118, and/or other components of the paving system 100. For example, the system controller 122 may be configured to actively modify, maintain, and/or otherwise control a reporting frequency of the various location sensors 130 described herein in order to vary the amount of location information received by the system controller 122. Controlling the reporting frequency of one or more location sensors 130 in this way may improve the efficiency with which the resources of the control system 120 are used. For instance, as shown in FIG. 2, the paving system 100 may include one or more geofences generated, located, and/or otherwise configured to assist with monitoring such operations. In any of the examples described herein, such geofences may comprise, for example, a virtual geographic boundary defined by GPS, cellular, near-field communication, RFID, and/or other components of the control system 120 (FIG. 1). Such geofences may enable the system controller 122, software operable on the system controller 122, and/or other components of the control system 120 to generate a signal or other response when a location sensor 130 carried by and/or disposed on a haul truck 104, a paving machine 106, one or more of the compaction machines 114, 116, 118, and/or other components of the paving system 100 approaches, enters, moves between various locations within, and/or leaves the virtual geographic boundary of the geofence. In some examples, the respective location sensors 130 may emit signals continuously, substantially continuously, or at predetermined intervals (e.g., every second, every two seconds, every five seconds, every ten seconds, every 15 seconds, etc.), and such signals may include information indicating the location of the component of the paving system 100 within or on which the location sensor 130 is disposed. In further examples, the location sensors 130 may be controlled to emit such signals at one or more reporting frequencies, or at varying reporting frequencies, based at least in part on a speed of the component of the paving system 100 (e.g., the speed of the haul truck 104), the current location of the component with respect to the worksite 112 (e.g., with respect to a geofence associated with the worksite 112), the distance between the current location of the component and the worksite 112 (e.g., the distance between the current location of the component and a geofence associated with the worksite 112), the estimated travel time between the current location of the component and the worksite 112, and/or other factors. In such examples, the system controller 122 may be configured to determine whether the location sensor 130 and, thus, the respective component of the paving system 100 is approaching, located within, and/or exiting one or more geofences based at least in part on such signals. Such signals may also include metadata or other components providing information uniquely identifying the location sensor 130 and/or the component of the paving system 100 (e.g., the haul truck 104) on which or in which the particular location sensor 130 is disposed. For example, such signals may include a device identifier uniquely identifying the location sensor 130 generating the signal. Additionally or alternatively, such signals may include an asset identifier uniquely identifying the component of the paving system 100 on which or in which the particular location sensor 130 is disposed.

As shown in FIG. 2, an example paving system 100 of the present disclosure may include a geofence 200 extending substantially along and/or otherwise substantially overlaying a perimeter of the paving material plant 102. Such a geofence 200 may, thus, substantially surround the paving material plant 102 and may correspond to an outer boundary of the paving plant 102. In such examples, a haul truck 104 may pass into the geofence 200 when entering the paving material plant 102 via a gate or other like entrance 202 of the paving material plant 102. Similarly, a haul truck 104 may pass out of the geofence 200 when exiting the paving material plant 102 via a gate or other like exit 204 of the paving material plant 102. Upon entering the paving material plant 102 via the entrance 202, a haul truck 104 may travel to one or more locations within the paving material plant 102 including a loading area associated with the paving material silo 134, a holding station proximate the load station 136, or any other such locations. In such examples, the paving system 100 may also include one or more respective geofences 206 extending substantially along and/or otherwise substantially overlaying a perimeter of such locations. In such examples, each geofence 206 may define a virtual boundary of the respective location within the paving material plant 102, and one or more of the geofences 206 may be disposed at least in part within the geofence 200.

In any of the examples described herein, a haul truck 104 may travel to a location associated with the load station 136 (e.g., a location associated with the geofence 206) where the haul truck 104 may be loaded with paving material 108 that is to be transported from the paving material plant 102 to the worksite 112. Before, during, or after being loaded with paving material 108, an operator of the haul truck 104 may be provided with a paving material ticket associated with the paving material 108 loaded into the haul truck 104. In some examples, such a paving material ticket may comprise a text file, an image file, a data file, and/or any other digital or electronic file configured to contain information, and to be executed and/or otherwise consumed by a server, a computer, a mobile phone, and/or other electronic device. Such a paving material ticket may be saved within a memory connected to and/or otherwise associated with the paving material plant controller 144 and/or the system controller 122, and may be transmitted to one or more additional electronic devices (e.g., an electronic device 128 carried by the operator of the haul truck 104, an electronic device 128 carried by a foreman or supervisor at the worksite 112, the truck controller 154, etc.) via, for example, the network 124. Additionally or alternatively, such a paving material ticket may comprise a physical card, ticket, piece of paper, or other physical object including any of the information described herein and configured for consumption by a human. Such a paving material ticket may be printed on an ink jet printer, a laser printer, or other printing device connected to the paving material plant controller 144 and/or the system controller 122.

An example paving material ticket may include information indicating the weight, volume, composition, temperature, and/or other characteristics of the paving material 108 deposited into the dump body 150 of the haul truck 104 at the paving material plant 102. Such a paving material ticket may also include a name, an address, GPS coordinates, and/or other information uniquely identifying the worksite 112 at which the paving material 108 will be utilized (e.g., a worksite identifier). In further examples, such a paving material ticket may also include a license plate number, an alphanumeric code, a serial number, and/or other information uniquely identifying the particular haul truck 104 receiving such paving material 108 at the paving material plant 102 (e.g., an asset identifier). In any of the examples described herein, the paving material plant controller 144 may generate the paving material ticket based at least in part on the haul truck 104 receiving the paving material 108 at the paving material silo 134 of the paving plant 102, and an example paving material ticket may include the asset identifier uniquely identifying the particular haul truck 104 receiving the paving material 108.

Further, any of the paving material tickets described herein may include a timestamp indicating the date and/or time at which the paving material ticket was generated. Additionally or alternatively, any of the paving material tickets described herein may include a timestamp indicating the date and/or time at which the paving material 108 was loaded into the haul truck 104.

After receiving the paving material ticket, the haul truck 104 may travel to the exit 204 of the paving material plant 102, and may pass through the exit 204 in order to exit the paving plant 102. By passing through the exit 204, the haul truck 104 may also exit the geofence 200 corresponding to the perimeter of the paving material plant 102. In some examples, the haul truck 104 may travel along a travel path 208 extending at least from the exit 204 to the worksite 112. For example, such a travel path 208 may comprise a travel route extending from the paving material plant 102 to the worksite 112. In such examples, the travel path 208 may extend through the worksite 112, and may also extend from the worksite 112 back to the paving material plant 102. In such examples, the travel path 208 may comprise a complete travel route of the haul truck 104 including a route that the haul truck travels while at the paving material plant 102, an outbound route extending from the paving material plant 102 to the worksite 112, a route that the haul truck 104 travels while at the worksite 112, and a return route extending from the worksite 112 back to the paving material plant 102. For example, the travel path 208 may include a segment 209 extending from the exit 204 of the paving material plant 102 to an entrance of the worksite 112. In such examples, the segment 209 may extend from the exit 204 of the paving material plant 102 to one or more geofences located at and/or associated with the worksite 112 and, in some examples, one or more such geofences may be located at an entrance to the worksite 112. In some examples, one or more such geofences may comprise a moving geofence associated with a paving machine 106 and/or other components of the paving system 100.

For example, as shown in FIG. 2, the paving system 100 may include a geofence 210 extending substantially along and/or otherwise substantially overlaying at least part of a perimeter of the worksite 112. In some examples, such a geofence 210 may substantially surround the worksite 112 and may correspond to an outer boundary of the worksite 112. In other examples, on the other hand, such a geofence 210 may be omitted and/or replaced by one or more moving geofences associated with a paving machine 106 and/or other components of the paving system 100 located at the worksite 112. With continued reference to FIG. 2, in some examples, a haul truck 104 may pass into the geofence 210 when entering the worksite 112 via a gate or other like entrance 212 of the worksite 112. Similarly, a haul truck 104 may pass out of the geofence 210 when exiting the worksite 112 via a gate or other like exit 214 of the worksite 112. Upon entering the worksite 112 via the entrance 212, a haul truck 104 may travel to one or more locations within the worksite 112, including a location at which a paving machine 106 of the paving system 100 is disposed. In such examples, the haul truck 104 may load, dispose, and/or otherwise transfer paving material 108 from the dump body 150 to, for example, the hopper 166 of the paving machine 106. Once the paving material 108 carried by the haul truck 104 has been transferred to the paving machine 106, the haul truck 104 may travel to the exit 214 of the worksite 112, and may pass through the exit 214 in order to exit the worksite 112. By passing through the exit 214, the haul truck 104 may also exit the geofence 210 corresponding to the perimeter of the worksite 112. In some examples, the haul truck 104 may then return to the paving material plant 102 via one or more segments of the travel path 208.

With continued reference to FIG. 2, and as noted above, in some examples, the paving system 100 may also include respective geofences substantially surrounding and/or otherwise associated with one or more of the components of the paving system 100 disposed at the worksite 112. In some examples, such geofences may replace the geofence 210 described above. For example, the paving system 100 (e.g., the control system 120 of the paving system 100) may include a geofence 222 substantially overlaying a perimeter of and/or substantially surrounding a paving machine 106 disposed within a perimeter of the worksite 112 (e.g., disposed within the geofence 210). The paving system 100 (e.g., the control system 120 of the paving system 100) may also include a geofence 224 substantially overlaying a perimeter of and/or substantially surrounding a compaction machine 114, a geofence 226 substantially overlaying a perimeter of and/or substantially surrounding a compaction machine 116, and/or a geofence 228 substantially overlaying a perimeter of and/or substantially surrounding a compaction machine 118. In any of the examples described herein, the paving system 100 may further include one or more additional geofences (not shown) substantially overlaying a perimeter of and/or substantially surrounding one or more additional components of the paving system 100 (e.g., substantially surrounding a cold planer or other excavation machine). Further, as shown in FIG. 2, the paving system 100 may include one or more additional geofences 230 overlaying the perimeter of and/or substantially surrounding the paving machine 106, one or more of the compaction machines 114, 116, 118, and/or other components of the paving system 100. For example, the geofence 222 may include a radius $R_1$ and the geofence 230 may include a radius $R_2$ that is greater than the radius $R_1$. In some examples, the radius $R_1$ may be between approximately 15 meters and approximately 30 meters, while the radius $R_2$ may be between approximately 200 meters and approximately 600 meters. In some examples, the geofence 230 may overlay, substantially surround, and/or may otherwise be indicative of the perimeter of the worksite 112, and in such examples, the geofence 210 described above may be omitted. Further, in any of the examples described herein, the radii $R_1$, $R_2$ may have respective values that are greater than or less than the approximate values noted above. It is also understood that the geofences 224, 226, 228 may have respective radii or other dimensions greater than, less than, or equal to the values noted above with respect to the radius $R_1$. Further, in any of the examples described herein, the geofence 222 may be disposed at least in part within the geofence 230.

In any of the examples described herein, one or more of the geofences described above (e.g., the geofences 222, 224, 226, 228, 230 shown in FIG. 2) may be substantially similar to the geofence 206 described above. For example, each of the geofences 222, 224, 226, 228, 230 may define a virtual boundary of a respective location within the worksite 112, and one or more of the geofences 222, 224, 226, 228, 230 may be disposed at least in part within the geofence 210. Further, each of the geofences 222, 224, 226, 228, 230 may be associated with a respective component of the paving system 100, and may move, relative to the work surface 110, commensurate with movement of the respective component of the paving system 100. For example, the geofence 222 and/or the geofence 230 may be generated based at least in part on location information generated using the location sensor 130 disposed on and/or carried by the paving machine 106. Such location information may comprise, for example, GPS coordinates indicating the location of the paving machine 106, and such location information may be generated in conjunction with the GPS satellite 132 (FIG. 1). In such examples, the geofence 222 and/or the geofence 230 may comprise a substantially circular virtual boundary, substantially surrounding the paving machine 106. In such examples, the location sensor 130 of the paving machine 106, and/or the paving machine 106 generally, may be disposed at a substantially central location (e.g., a center point) within the geofence 222 and/or the geofence 230. Further, the geofence 222 and/or the geofence 230 may be configured such that the location sensor 130 of the paving machine 106 and/or the paving machine 106 generally is maintained at such a substantially central location within the geofence 222 and/or the geofence 230 as the paving machine 106 moves along the work surface 110. Further, it is understood that while the geofences 222, 230 are illustrated as being circular in FIG. 2, in additional embodiments, the geofence 222 and/or the geofence 230 may be substantially square, substantially rectangular, substantially hexagonal, substantially octagonal, and/or any other shape. Further, it is understood that the geofence 222 and/or the geofence 230 may have any desired radius, diameter, circumference, perimeter, and/or other dimensions in order to substantially surround the paving machine 106 and/or in order to substantially overlap the perimeter of the worksite 112. In any of the examples described herein the radius, diameter, circumference, perimeter, and/or other dimensions of the geofence 222 and/or the geofence 230 may be larger than, for example, a corresponding perimeter, length, width, and/or other dimension of the paving machine 106 such that the geofence 222 and/or the geofence 230 may surround the entire outer boundary and/or perimeter of the paving machine 106.

One or more of the geofences 224, 226, 228 may be substantially similar to the geofence 222 and/or the geofence 230 described above. For example, the geofence 224 may be generated based at least in part on location information generated using the location sensor 130 disposed on and/or carried by the compaction machine 114. Such location information may comprise, for example, GPS coordinates indicating the location of the compaction machine 114, and such location information may be generated in conjunction with the GPS satellite 132 (FIG. 1). In such examples, the geofence 224 may comprise a substantially circular virtual boundary, substantially surrounding the compaction machine 114. In such examples, the location sensor 130 of the compaction machine 114, and/or the compaction machine 114 generally, may be disposed at a substantially central location (e.g., a center point) within the geofence 224. Further, the geofence 224 may be configured such that the location sensor 130 of the compaction machine 114, and/or the compaction machine 114 generally, is maintained at such a substantially central location within the geofence 224 as the compaction machine 114 moves along the work surface 110. Further, it is understood that while the geofence 224 is illustrated as being circular in FIG. 2, in additional embodiments, the geofence 224 may be substantially square, substantially rectangular, substantially hexagonal, substantially octagonal, and/or any other shape. Further, it is understood that the geofence 224 may have any desired radius, diameter, circumference, perimeter, and/or other dimensions in order to substantially surround the compaction machine 114. In any of the examples described herein the radius, diameter, circumference, perimeter, and/or other dimensions of the geofence 224 may be larger than, for example, a corresponding perimeter, length, width, and/or other dimension of the compaction machine 114 such that the geofence 224 may surround the entire outer boundary and/or perimeter of the compaction machine 114. In any of the example embodiments herein, one or more of the geofences 226, 228 may be substantially similar to the geofence 224 described above.

In any of the example embodiments described herein, system controller 122 (FIG. 1) and/or other components of the paving system 100 may be configured to select, vary, modulate, and/or otherwise modify a rate at which one or more location sensors 130 determines and/or provides location information to the system controller 122 via the network 124. For example, the system controller 122 may be configured to select, vary, modulate, and/or otherwise modify a rate at which a location sensor 130 disposed on and/or otherwise carried by a haul truck 104 provides GPS coordinates, UTS coordinates, and/or other location information indicative of a location of the haul truck 104. For purposes of discussion, such a rate may be referred to herein as a "reporting frequency." Further, as will be described below, in example embodiments the system controller 122 may select, vary, modulate, and/or otherwise modify the reporting frequency based at least in part on one or more parameters associated with the haul truck 104 or other component of the paving system 100 on which the location sensor 130 is disposed. For example, the system controller 122 may select, vary, modulate, and/or otherwise modify the reporting frequency based at least in part on a distance between the paving system component (e.g., the particular haul truck 104 on which the location sensor 130 is disposed) and one or more geofences, an expected travel time associated with the paving system component traveling from its current location to one or more geofences, a speed of the paving system component, a previous reporting frequency, a default reporting frequency, a comparison to one or more threshold values, a previous reporting frequency of the location sensor 130, a size of a particular geofence, a distance between a first geofence and a second geofence, and/or other factors associated with the paving material plant 102, the travel path 208, and/or the worksite 112.

By way of example, and merely for purposes of describing various methods for selecting, varying, modulating, modifying, maintaining, and/or otherwise controlling the reporting frequency, FIG. 2 illustrates multiple segments of the travel path 209 disposed between the paving material plant 102 and the worksite 112. FIG. 2 also illustrates multiple locations along the travel path 209 and/or along such segments. As will be described with respect to FIG. 3, the system controller 122 and/or other components of the control system 120 may select, vary, modulate, modify, maintain, and/or otherwise control the reporting frequency based at least in part on one or more distances, expected travel times, speeds, coordinates (e.g., GPS coordinates, UTS coordinates, etc.), and/or other parameters associated with such segments of the travel path 209 and/or associated with such locations. For example, the travel path 209 may include a segment 209 extending from the exit 204 of the paving material plant 102 to the entrance 212 of the worksite 112. In some examples, the segment 209 may extend from the exit 204 of the paving material plant 102 to the geofence 210. In other examples, the segment 209 may extend from the exit 204 of the paving material plant 102 to the geofence 230 described above with respect to the paving machine 106. In any of the examples described herein, the segment 209 of the travel path 208 may include one or more locations A, B along the travel path 208. For example, the location A may comprise a location along the travel path 208 that is located relatively closer to the paving material plant 102 than the location B.

In some examples, the travel path 208 may also include a segment 232 extending from the geofence 210 and/or the entrance 212 of the worksite 112 to the geofence 230. The travel path 208 may also include a segment 234 extending from the geofence 230 to the paving machine 106. For example, the segment 234 may extend from the geofence 230 to a location adjacent, proximate, and/or on the paving machine 106. In such examples, the segment 234 may extend from the geofence 230 to the location sensor 130 disposed on the paving machine 106, and/or the location sensor 130 generating the geofence 230 and/or the geofence 222. In any of the examples described herein, the segment 232 of the travel path 208 may include one or more locations (e.g., a location C) along the travel path 208, and the segment 234 may include one or more additional locations (e.g., locations D, E) along the travel path 208. For example, the location C may comprise a location along the travel path 208 that is located between the entrance 212 of the worksite 112 and the geofence 230. Likewise, the location D may comprise a location along the travel path 208 that is within the geofence 230 and located outside of the geofence 222. In such examples, the location E may comprise a location along the travel path 208 that is within both the geofence 230 and the geofence 222. For example, the location E may comprise a location along the travel path 208 at which the haul truck 104 may deposit a load of paving material 108 into the hopper 166 of the paving machine 106.

As shown in FIG. 2, the travel path 208 may further include a segment 236 extending from the paving machine 106 to the geofence 230. For example, the segment 236 may extend to the geofence 230 from a location adjacent, proximate, and/or on the paving machine 106. In such examples, the segment 236 may extend to the geofence 230 from the location sensor 130 disposed on the paving machine 106, and/or the location sensor 130 generating the geofence 230 and/or the geofence 222. In any of the examples described herein, the segment 236 of the travel path 208 may include one or more locations (e.g., a location F) along the travel path 208. For example, the location F may comprise a location along the travel path 208 that is located within the geofence 230 and outside of the geofence 222. The travel path 208 may also include a segment 238 extending from the geofence 230 to the exit 214 of the worksite 112. In such examples, the segment 238 of the travel path 208 may include one or more locations (e.g., a location G) along the travel path 208. For example, the location G may comprise a location along the travel path 208 that is located between the geofence 230 and the exit 214 of the worksite 112.

As illustrated in FIG. 2, in some examples, the travel path 208 may extend to and/or from one or more additional locations disposed between the worksite 112 and the paving material plant 102. For example, in some construction, mining, paving, and/or other operations, one or more haul trucks 104 and/or other components of the paving system 100 may be loaded with dirt, concrete, minerals, excavated materials, and/or other materials while at the worksite 112. In such operations, the haul trucks 104 and/or other components of the paving system 100 may transport such materials, along the travel path 208, from the worksite 112 to a dumpsite 240 and/or other location disposed between the paving material plant 102 and the worksite 112. In such operations, such materials may be deposited and/or otherwise unloaded at the dumpsite 240 before the haul trucks 104 and/or other components of the paving system 100 return to the paving material plant 102 along the travel path 208. In any of the examples described herein, such dumpsites 240 may include one or more respective geofences 242 associated therewith. In such examples, one or more such geofences 242 may be configured similar to the geofences 200, 206 described above with respect to the paving material plant 102. For example, the geofence 242 may extend along, substantially overlap, and/or at least partly define an outer perimeter of the dumpsite 240. Although not illustrated in FIG. 2, one or more such dumpsites 240 may include an entrance and/or an exit, and in some examples, the geofence 242 may extend along, substantially overlap, and/or at least partly define the entrance and/or the exit of such a dumpsite 240.

As shown in FIG. 2, in some examples the travel path 208 may include a segment 244 extending from the exit 214 of the worksite 112 to the geofence 242 associated with the dumpsite 240. The travel path 208 may also include one or more segments 246, 248 extending within the geofence 242 and through the dumpsite 240. For example, the segments 246, 248 may extend, either alone or in combination, from an entrance of the dumpsite 240 to an exit of the dumpsite 240. The segments 246, 248 may also comprise respective travel routes of a haul truck 104 and/or other paving system component while the paving system component is disposed at the dumpsite 240. In any of the examples described herein, the segments 246, 248 of the travel path 208 may include one or more locations (e.g., locations I, J) along the travel path 208. For example, the location I may comprise a location along the travel path 208, within the geofence 242, associated with a weight station, ticket station, or other station of the dumpsite 240, and the location J may comprise a location along the travel path 208, within the geofence 242, associated with a dump zone and/or other unloading zone of the dumpsite 240.

With continued reference to FIG. 2, in some examples, the travel path 208 may also include a segment 250 extending from the geofence 242 to the entrance 202 of the paving material plant 102. In such examples, the segment 250 of the travel path 208 may include one or more locations (e.g., a location K) along the travel path 208. For example, the location K may comprise a location along the travel path 208 that is located between the geofence 242 and the entrance 202 of the paving material plant 102. As will be described with respect to FIG. 3, the system controller 122 (FIG. 1) and/or other components of the control system 120 may select, vary, modulate, modify, maintain, and/or otherwise control the reporting frequency of one or more location sensors 130 carried by and/or disposed on a component of the paving system 100 (e.g., a location sensor 130 disposed on a haul truck 104 traveling along the travel path 208) based at least in part on one or more distances, expected travel times, speeds, coordinates (e.g., GPS coordinates, UTS coordinates, etc.), and/or other parameters associated with the various segments of the travel path 208 (e.g., associated with one or more of the segments 209, 232-238, and 244-250) and/or associated with one or more locations (e.g., one or more of the locations A-K) along the travel path 208.

Figure 3:
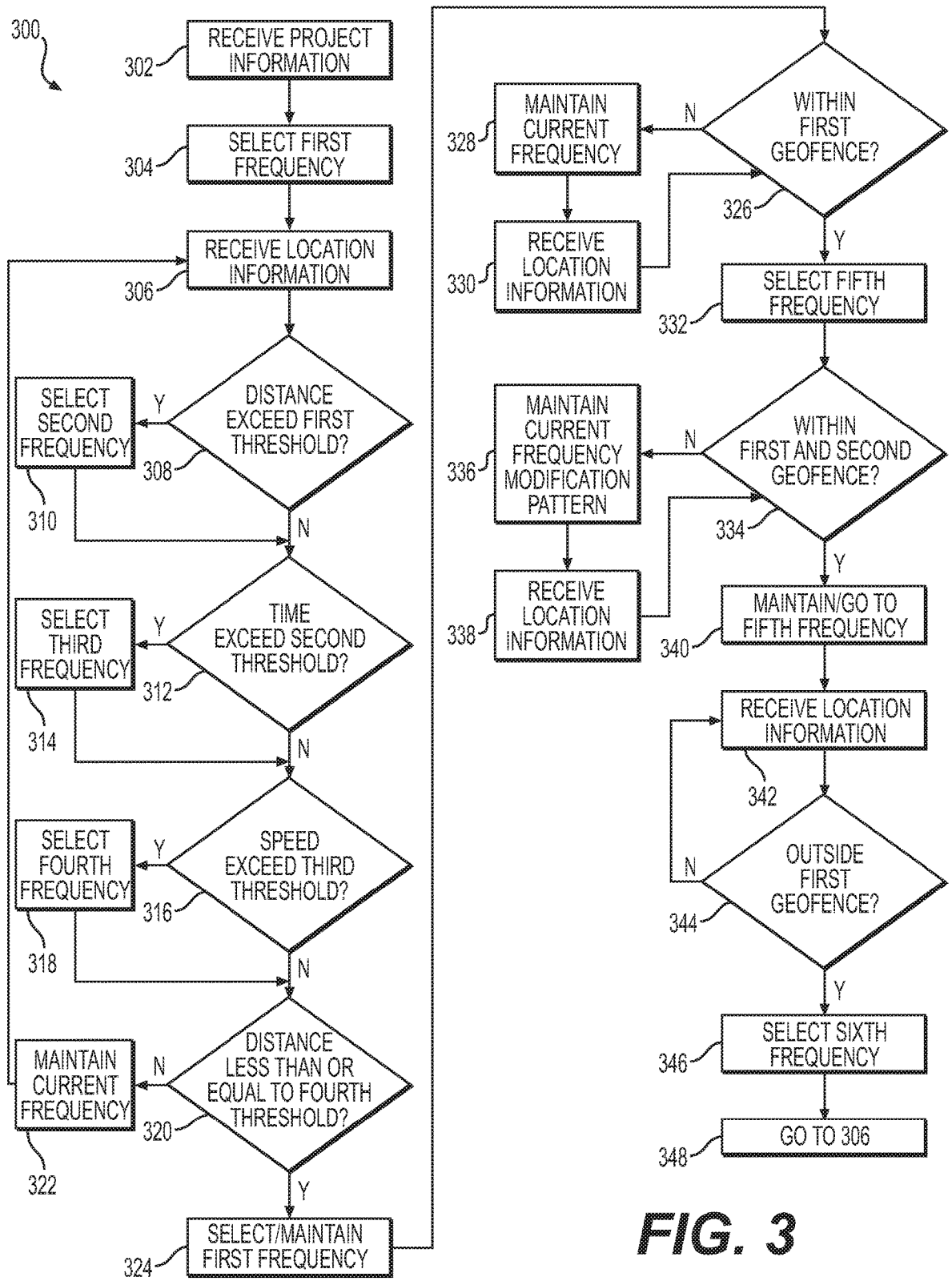
FIG. 3 is a flow chart depicting an example method associated with the paving system shown in FIG. 1.

FIG. 3 illustrates a flow chart depicting an example method 300 of controlling the reporting frequency of one or more location sensors 130 associated with the paving system 100. In particular, the flow chart of FIG. 3 illustrates an example method 300 of selecting, varying, modulating, modifying, maintaining, and/or otherwise controlling the reporting frequency of one or more location sensors 130 carried by and/or disposed on a component of the paving system 100 based at least in part on one or more distances, expected travel times, speeds, coordinates, and/or other parameters, in order to improve the efficiency of the paving system 100. For instance, aspects of the method 300 may assist a worksite foreman, an operator of the paving material plant 102, and/or other personnel associated with the paving system 100 to more accurately determine the location of such paving system components at any given time. At certain locations along the travel path 208, aspects of the method 300 may also actively reduce the amount of location data generated and/or sent by the respective location sensors 130 described herein, thereby reducing the resource load (e.g., bandwidth requirements) on the network 124, and reducing the resource load (e.g., memory and processor requirements) on the system controller 122. As a result of such reduced resource loads, the use of fuel and/or other resources by the components of the paving system 100 may be reduced, thereby reducing operating costs. Additionally, due to aspects of the method 300, the time required to deposit the mat of paving material 108 may be reduced, thereby further reducing operating costs.

The example method 300 is illustrated as a collection of steps in a logical flow diagram, which represents operations that can be implemented in hardware, software, or a combination thereof. In the context of software, the steps represent computer-executable instructions stored in memory. When such instructions are executed by, for example, the system controller 122, such instructions may cause the system controller 122, one or more location sensors 130, various components of the control system 120, the paving material plant controller 144, the truck controller 154, the paving machine controller 172, the electronic device 128, and/or other components of the paving system 100 to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 300 is described with reference to the paving system 100, the control system 120, the system controller 122, the paving material plant 102, the various location sensors 130 associated with the paving system 100, and/or other items shown in FIGS. 1 and 2. In particular, although any part of and/or the entire method 300 may be performed by the truck controller 154, the paving machine controller 172, the paving material plant controller 144, the electronic device 128, and/or other components of the paving system 100, unless otherwise specified, the method 300 will be described below with respect to the system controller 122, a haul truck 104, and a location sensor 130 disposed on the haul truck 104 for ease of description.

With reference to FIG. 3, at 302 the system controller 122 may receive project information and/or any other information associated with the paving system 100 and/or with a particular paving project being performed by the paving system 100. Such project information may include, for example, information indicating the weight, volume, composition, temperature, and/or other characteristics of paving material 108 deposited into the dump body 150 of a haul truck 104 at a paving material plant 102. Such project information may also include a worksite identifier and/or other information uniquely identifying the worksite 112 at which the paving material 108 will be utilized. In further examples, such project information may also include a license plate number, an alphanumeric code, a serial number, and/or other asset identifier uniquely identifying a particular paving asset (e.g., a particular haul truck 104) receiving such paving material 108 at the paving material plant 102. For example, a paving plant employee may observe the asset identifier associated with a particular haul truck 104 during inspection of the haul truck 104 before, during, or after the haul truck 104 is loaded with paving material 108. In such examples, the paving plant employee may record the asset identifier, and may provide an input to the paving material plant controller 144 and/or to the system controller 122 including information indicating the asset identifier. Alternatively, one or more cameras, scanners, RFID readers, near-field communication scanners, barcode readers, or other detection devices may automatically capture and/or otherwise observe the asset identifier associated with the haul truck 104. In such examples, the one or more cameras or other detection devices may send a signal to the paving material plant controller 144 and/or to the system controller 122 including information indicating the asset identifier associated with the haul truck 104.

The project information received at 302 may further include a timestamp indicating the date and/or time at which a paving material ticket was generated, as well as a name, number, address, alphanumeric code, and/or other source identifier uniquely identifying the source of the paving material ticket. For example, in embodiments in which the paving material ticket is printed and/or otherwise generated at the paving material plant 102, such a source identifier may comprise a name, number, address, or other information uniquely identifying the particular paving material plant 102. Additionally, in any of the examples described herein, the project information received at 302 may include a name, a number, an address, an alphanumeric code, and/or or other project identifier uniquely identifying the paving project with which the paving material 108 loaded into the haul truck 104 is associated. Such a project identifier may be provided by, for example, an operator of the paving material plat 102 before, during, or after the haul truck 104 the paving material 108 is loaded into the haul truck 104. Further, in any of the examples described herein, the project information received at 302 may include GPS coordinates, UTS coordinates, and/or other information identifying the one or more geofences that the haul truck 104 may encounter while traveling along the travel path 208 between the paving material plant 102 and the worksite 112. As will be described below, in such examples, the system controller 122 may utilize the information identifying the one or more geofences to select, vary, modulate, modify, maintain, and/or otherwise control the reporting frequency of one or more location sensors 130 disposed on the haul truck 104 as the haul truck 104 travels along the travel path 208.

At 304, the system controller 122 may select and/or determine a first reporting frequency of a location sensor 130 disposed on the haul truck 104. In some examples, the first reporting frequency selected at 302 may comprise a default reporting frequency of the location sensor 130. According to such a first reporting frequency, the location sensor 130 may generate and/or provide a signal to the system controller 122 including location information every 30 seconds, every minute, every 2 minutes, every 5 minutes, every 10 minutes, etc. In such examples, the system controller 122 may select the first reporting frequency (e.g., the default reporting frequency) based at least in part on a current location of the haul truck 104 (e.g., based at least in part on the haul truck 104 being disposed at a location within and/or proximate the geofence 200).

In additional examples, the system controller 122 may select the first reporting frequency (e.g., the default reporting frequency) based at least in part on a distance between a current location of the haul truck 104 (e.g., a location within and/or proximate the geofence 200) and, for example, the entrance 212 of the worksite 112 or the geofence 230. For instance, at 304 the system controller 122 may select the first reporting frequency based at least in part on the distance between the current location of the haul truck 104 and the geofence 230 exceeding a distance threshold (e.g., a threshold of 50 km). In other examples, at 304 the system controller 122 may select the first reporting frequency based at least in part on an expected travel time associated with the haul truck 104 traveling from its current location (e.g., a location within and/or proximate the geofence 200) to, for example, the entrance 212 of the worksite 112 or the geofence 230. For instance, at 304. The system controller 122 may select the first reporting frequency based at least in part on an expected travel time (e.g., determined by the system controller 122, at least in part, using the algorithm: Distance=Rate×Time) associated with the haul truck 104 traveling, along the travel path 208, from its current location to the geofence 230 exceeding a time threshold (e.g., a threshold of 30 minutes). In still further examples, at 304 the system controller 122 may select the first reporting frequency based at least in part on a current speed of the haul truck 104 exceeding a speed threshold (e.g., a threshold of 100 km/hr). It is understood that the values noted above with respect to the various thresholds are merely examples values, and in further embodiments, values greater than or less than those noted above may be utilized by the system controller 122 at 304. Further, at 304 the system controller 122 may select the first reporting frequency from one or more acceptable reporting frequencies stored in a memory (e.g., stored in a look-up table) associated with the system controller 122. In some instances, such a first reporting frequency may comprise a reporting frequency previously selected by the system controller 122 when one or more additional components of the paving system 100 were located at the current location of the haul truck 104. Alternatively, at 304, the system controller 122 may estimate, calculate, and/or otherwise determine the first frequency utilizing one or more additional algorithms, neural networks, interpolation techniques, and/or other processes.

At 306, the system controller 122 may receive location information at the first reporting frequency selected at 304. The location information received at 306 may be generated by the location sensor 130 disposed on the haul truck 104 and/or other paving system component, and such location information may indicate a location of the haul truck 104 or other paving system component on which the location sensor 130 is disposed. For example, at 306 the system controller 122 may receive GPS coordinates, UTS coordinates, and/or other location information generated using a location sensor 130 disposed on and/or carried by the particular haul truck 104 with which the project information received at 302 is associated. Such location information may indicate, among other things, one or more locations of the haul truck 104 (e.g., location A, location B, etc.) along the travel path 208. In such examples, the location information received at 306 may indicate a location of the haul truck 104 along the travel path 208 (e.g., a location along the segment 209 of the travel path 208) and outside of the geofence 200.

For example, at 306 the system controller 122 may identify and/or otherwise determine a location A of the haul truck 104, along the travel path 208, based at least in part on the location information received at 306. In such examples, at 308 the system controller 122 may determine a distance between the location A of the haul truck 104, and at least one of the entrance 212 of the worksite 112 and the geofence 230. For example, at 308 the system controller 122 may determine a distance along the travel path 208 between the location A and the geofence 230. Such a distance may be measured along the travel path 208 from, for example, the location A to an intersection of the travel path 208 with an outer perimeter of the geofence 230. In other examples, on the other hand, such a distance may be measured substantially along the travel path 208 from, for example, the location A to the location sensor 130 carried by the paving machine 106 and used to generate the geofence 230. It is understood that one or more of the distances described with respect to 304 may be measured and/or otherwise determined in a similar manner.

At 308, the system controller 122 may determine whether such a distance exceeds a first threshold (e.g., a distance threshold) stored in a memory associated with the system controller 122. For example, such a distance threshold may comprise a maximum distance between the haul truck 104 and the geofence 230 beyond which the system controller 122 may reduce the first reporting frequency selected at 304 in order to reduce the amount of location information provided by the location sensor 130 and/or received by the system controller 122. In some examples, such a distance threshold may be equal to approximately 50 km. In additional embodiments, on the other hand, such a distance threshold may have a value greater than or less than approximately 50 km. In such examples, if, at 308, the system controller 122 determines that the distance between the location A and the geofence 230 exceeds such a distance threshold (308—Yes), at 310 the system controller 122 may select a reporting frequency (e.g., a second reporting frequency) that is different from the first reporting frequency selected at 304. In particular if, at 308, the system controller 122 determines that the distance between the location A and the geofence 230 exceeds such a distance threshold (308—Yes), at 310 the system controller 122 may determine and/or select a second reporting frequency that is less than the first reporting frequency selected at 304. According to such a second reporting frequency, the location sensor may generate and/or provide a signal to the system controller 122 including location information every 5 minutes, every 10 minutes, every 15 minutes, etc. In such examples, at 310 the system controller 122 may control the location sensor 130 located on the haul truck 104 to provide additional location information, via the network 124, at the second reporting frequency selected at 310.

However, if at 308, the system controller 122 determines that the distance between the location A and the geofence 230 does not exceed such a distance threshold (308—No), at 312 the system controller 122 may determine whether an expected travel time associated with the haul truck 104 traveling from the location A to the geofence 230 exceeds a second threshold (e.g., a time threshold) stored in the memory associated with the system controller 122. It is understood that such an expected travel time may be determined by the system controller 122 at 312 using, among other things, the algorithm: Distance=Rate×Time. In such determinations, one or more additional terms, factors, multipliers, modifiers, and/or other components may be included in such an algorithm to account for weather conditions, traffic conditions, road quality, and/or other factors associated with the travel path 208. In the example method 300, such a time threshold may comprise a maximum permissible time associated with the haul truck 104 traveling to the geofence 230 beyond which the system controller 122 may reduce the currently selected reporting frequency (e.g., the first reporting frequency selected at 304) in order to reduce the amount of location information provided by the location sensor 130 and/or received by the system controller 122. In some examples, such a time threshold may be equal to approximately 30 minutes. In additional embodiments, on the other hand, such a time threshold may have a value greater than or less than approximately 30 minutes. In such examples, if, at 312, the system controller 122 determines that the expected travel time associated with the haul truck 104 traveling from the location A to the geofence 230 (e.g., to a perimeter of the geofence 230) exceeds such a time threshold (312—Yes), at 314 the system controller 122 may select a reporting frequency (e.g., a third reporting frequency) that is different from the first reporting frequency selected at 304. In particular if, at 312, the system controller 122 determines that the expected travel time associated with the haul truck 104 traveling from the location A to the geofence 230 exceeds such a time threshold (312—Yes), at 314 the system controller 122 may determine and/or select a third reporting frequency that is less than the first reporting frequency selected at 304. According to such a third reporting frequency, the location sensor 130 may generate and/or provide a signal to the system controller 122 including location information every 5 minutes, every 10 minutes, every 15 minutes, etc. In some examples, the third reporting frequency selected at 314 may be less than or equal to the second reporting frequency selected at 310. In such examples, at 314 the system controller 122 may control the location sensor 130 located on the haul truck 104 to provide additional location information, via the network 124, at the third reporting frequency selected at 314.

Further, if at 312, the system controller 122 determines that the expected travel time associated with the haul truck 104 traveling from the location A to the geofence 230 does not exceed such a time threshold (312—No), at 316 the system controller 122 may determine whether a speed of the haul truck 104 (e.g., a current speed) at the location A exceeds a third threshold (e.g., a speed threshold) stored in the memory associated with the system controller 122. Such a speed of the haul truck 104 may be received along with the location information at 306 and/or may be determined based at least in part on the location information received at 306. In the method 300, such a speed threshold may comprise a maximum speed associated with the haul truck 104 traveling to the geofence 230 along the travel path 208 above which the system controller 122 may reduce the currently selected reporting frequency (e.g., the first reporting frequency selected at 304) in order to reduce the amount of location information provided by the location sensor 130 and/or received by the system controller 122. In some examples, such a speed threshold may be equal to approximately 100 km/hour. In additional embodiments, on the other hand, such a speed threshold may have a value greater than (e.g., faster than) or less than (e.g., slower than) approximately 100 km/hour. Further, in some examples, at 316 the system controller 122 may also determine whether, as the haul truck 104 reaches location A, the haul truck 104 has been traveling at a speed exceeding the speed threshold for greater than a threshold period of time (e.g., 2 minutes, 5 minutes, 10 minutes, 20 minutes, etc.). In such examples, the evaluation at 316 may not solely comprise a determination based on an instantaneous speed of the haul truck 104 at the location A. Instead, in such examples, at 316 the system controller 122 may determine whether the haul truck 104 has been traveling at a speed exceeding the predetermined speed threshold for at least a threshold period of time before, for example, selecting a fourth reporting frequency at 318.

In the example method 300, if at 316, the system controller 122 determines that the speed of the haul truck 104 at location A exceeds such a speed threshold (316—Yes), at 318 the system controller 122 may select a reporting frequency (e.g., a fourth reporting frequency) that is different from the first reporting frequency selected at 304. In particular if, at 316, the system controller 122 determines that the speed of the haul truck 104 at the location A exceeds such a speed threshold (316—Yes), at 318 the system controller 122 may determine and/or select a fourth reporting frequency that is less than the first reporting frequency selected at 304. According to such a fourth reporting frequency, the location sensor 130 may generate and/or provide a signal to the system controller 122 including location information every 5 minutes, every 10 minutes, every 15 minutes, etc. In some examples, the fourth reporting frequency selected at 318 may be less than or equal to the second reporting frequency selected at 310 and/or less than or equal to the third reporting frequency selected at 318. In such examples, at 318 the system controller 122 may control the location sensor 130 located on the haul truck 104 to provide additional location information, via the network 124, at the fourth reporting frequency selected at 318.

Accordingly, in view of the processes associated with steps 306-318 described above, it is understood that in some examples, the system controller 122 may determine a location (e.g., location A) of a component of the paving system 100 (e.g., a haul truck 104) based at least in part on the location information received at 306. Additionally, based at least in part on such location information and/or on the determined location (e.g., location A), the system controller 122 may determine at least one of: a distance between the determined location and the geofence 230 exceeds a distance threshold, an expected travel time associated with the component of the paving system 100 traveling from the determined location to the geofence 230 exceeds a time threshold, or a speed of the component of the paving system 100 at the determined location exceeds a speed threshold. In such examples, based on determining at least one of the factors noted above, the system controller 122 may control the location sensor 130 to provide additional location information (e.g., to provide one or more signals including such additional location information) indicating respective locations of the component of the paving system 100 at an additional reporting frequency that is less than, for example, the first reporting frequency selected at 304.

However, if at 316, the system controller 122 determines that the speed of the haul truck 104 at location A does not exceed such a speed threshold (316—No), at 320 the system controller 122 may determine whether a distance between a current location (e.g., a location C) of the component of the paving system 100 (e.g., the haul truck 104), and at least one of the geofence 230 or the entrance 212 of the worksite 112 is less than or equal to a corresponding distance threshold. It is understood that the distance threshold evaluated at 320 may be different from the first threshold described above with respect to 308.

For example, at 320 the system controller 122 may receive additional location information from the location sensor 130, via the network 124, at the reporting frequency selected at 306, 310, 314, or 318. At 320, the system controller 122 may identify and/or otherwise determine the current location C of the haul truck 104 based at least in part on the additional location information received at 320. In such examples, at 320 the system controller 122 may determine a distance between the location C of the haul truck 104, and at least one of the entrance 212 of the worksite 112 and the geofence 230. For example, at 308 the system controller 122 may determine a distance along the travel path 208 (e.g., along the segment 232) between the location C and the geofence 230. Such a distance may be measured along the travel path 208 from, for example, the location C to an intersection of the travel path 208 with an outer perimeter of the geofence 230. In other examples, on the other hand, such a distance may be measured substantially along the travel path 208 from, for example, the location C to the location sensor 130 carried by the paving machine 106 and used to generate the geofence 230. At 320, the system controller 122 may determine whether such a distance exceeds a fourth threshold (e.g., a distance threshold) stored in the memory associated with the system controller 122. For example, such a distance threshold may comprise a minimum distance between the haul truck 104 and the geofence 230 beyond which the system controller 122 may increase the current reporting frequency (e.g., the reporting frequency selected at one of 310, 314, or 322) to the first reporting frequency selected at 304 in order to increase the amount of location information provided by the location sensor 130 and/or received by the system controller 122. Increasing the reporting frequency in this way may, for example, improve the accuracy with which the system controller 122 may approximate and/or determine the location of the haul truck 104 as the haul truck 104 approaches the geofence 230. For at least the reasons noted herein, such improved accuracy may be useful in improving the efficiency of the paving system 100.

In some examples, the distance threshold utilized for comparison purposes at 320 may be equal to approximately 5 km. In additional embodiments, on the other hand, such a distance threshold may have a value greater than or less than approximately 5 km. In such examples, if, at 320, the system controller 122 determines that the distance between the location C and the geofence 230 is not less than or equal to such a distance threshold (320—No), at 322 the system controller 122 may control the location sensor 130 to maintain the current reporting frequency (e.g., maintain the reporting frequency selected at one of 304, 310, 314, or 322). If, on the other hand, at 320 the system controller 122 determines that the distance between the location C and the geofence 230 is less than or equal to such a distance threshold (320—Yes), at 324 the system controller 122 may determine and/or select the first reporting frequency described above with respect to 304. For instance, in such examples, if the reporting frequency was modified (e.g., reduced) at one of steps 310, 314, or 318, at 324 the system controller 122 may increase the reporting frequency to the first reporting frequency as the haul truck 104 approaches the geofence 230 and/or other such areas of interest. In such examples, and based at least in part on the determination made at 320, at 324 the system controller 122 may control the location sensor 130 located on the haul truck 104 to provide additional location information, via the network 124, at the first reporting frequency described above with respect to 304. As noted above, such a first reporting frequency may comprise a default reporting frequency of the location sensor 130. Accordingly, at 324, the system controller 122 may receive additional location information from the location sensor 130, via the network 124, at the first reporting frequency.

The additional location information received by the system controller 122 at 324, at the first reporting frequency, may identify and/or otherwise indicate one or more additional locations of the haul truck 104. For example, the additional location information received by the system controller 122 at 324 may identify and/or otherwise indicate a location D of the haul truck 104 along the travel path 208. In such examples, at 326. The system controller 122 may determine, based at least in part on the location information received at 324, whether the location D of the haul truck 104, is within a first geofence. Such a first geofence may comprise, for example, the geofence 210 substantially overlaying at least part of a perimeter of the worksite 112. Alternatively, such a first geofence may comprise the geofence 230 described above and associated with the paving machine 106. For example, in embodiments in which such a first geofence comprises the geofence 230, at 326 the system controller 122 may determine whether the location D of the haul truck 104 is within the geofence 230. In such examples, at 326 the system controller 122 may determine whether the location D of the haul truck 104 along the segment 234 of the travel path 208 is at a distance less than the radius $R_2$ from the paving machine 106 and/or from the location sensor 130 carried by the paving machine 106.

In such examples, if at 326 the system controller 122 determines that the location D of the haul truck 104 is not within the geofence 230 (326—No), at 328 the system controller 122 may control the location sensor 130 to maintain the current reporting frequency (e.g., maintain the first reporting frequency selected at 324). For example, at 328 the system controller 122 may control the location sensor 130 to provide additional location information at the first reporting frequency. At 330, the system controller 122 may receive the additional location information provided at 328, and such additional location information may identify and/or may be indicative of one or more additional locations of the haul truck 104 along the travel path 208. The system controller 122 may then proceed to 326.

If, on the other hand, at 326 the system controller 122 determines that the location D is within the geofence 230 (326—Yes), at 332 the system controller 122 may determine and/or select an additional reporting frequency (e.g., a fifth reporting frequency) greater than the first reporting frequency maintained at 328. For instance, determining, at 236, that a current location D of the haul truck 104 is within the geofence 230 may indicate that the location of the haul truck 104 should be determined with greater frequency and/or accuracy. As a result, at 332 the system controller 122 may increase the reporting frequency from the first reporting frequency to the fifth reporting frequency as the haul truck 104 enters the geofence 230, and/or approaches the geofence 222 or other such areas of interest at the worksite 112. In such examples, and based at least in part on the determination made at 326, at 332 the system controller 122 may control the location sensor 130 located on the haul truck 104 to provide additional location information, via the network 124, at the fifth reporting frequency, and in some examples the fifth reporting frequency may comprise a maximum reporting frequency of the location sensor 130. According to such a fifth reporting frequency, the location sensor 130 may generate and/or provide a signal to the system controller 122 including location information every second, every two seconds, every 5 seconds, every 10 seconds, every 15 seconds, etc. Accordingly, at 332, the system controller 122 may receive additional location information from the location sensor 130, via the network 124, at the fifth reporting frequency.

In example embodiments of the present disclosure, the system controller 122 may control the location sensor 130 to provide location information at the various reporting frequencies described herein (e.g., the reporting frequencies described above with respect to 310, 314, 318, 324, 332, etc.) in accordance with one or more reporting frequency modification patterns. For example, the system controller 122 may control the location sensor 130 to provide location information at the reporting frequencies described above with respect one or more of 310, 314, 318, 324, and 332 by actively changing a current reporting frequency of the location sensor 130 in a substantially instantaneous manner. In such examples, the system controller 122 may modify the reporting frequency of the location sensor 130 in a substantially binary fashion.

In other examples, the system controller 122 may control the location sensor 130 to provide location information at the reporting frequencies described above with respect one or more of 310, 314, 318, 324, and 332 by actively changing a current reporting frequency of the location sensor 130 in a substantially stepwise manner. For instance, the system controller 122 may modify (e.g., increase or decrease) the reporting frequency of the location sensor 130 in a series of incremental steps (e.g., in accordance with a plurality of step changes in the reporting frequency of the location sensor 130). In some examples, such incremental modifications to the reporting frequency may comprise a series of substantially equal step changes. In other examples, on the other hand, such incremental modifications to the reporting frequency may comprise a series of unequal step changes (e.g., a series of steps or other increments that increase or decrease logarithmically, exponentially, or according to another pattern or function). In still further examples, system controller 122 may control the location sensor 130 to provide location information at the reporting frequencies described above with respect one or more of 310, 314, 318, 324, and 332 by actively changing a current reporting frequency of the location sensor 130 at a constant rate, a variable rate, a predetermined rate (e.g., constant or variable), and/or at a rate that is determined in substantially real-time based on the distance between the current location of the haul truck 104 and a geofence (e.g., the geofence 230), the expected travel time associated with the haul truck 104 traveling from its current location to such a geofence, a speed of the haul truck 104, weather conditions, traffic conditions, road quality, and/or other parameters. For instance, in some examples the system controller 122 may control the location sensor 130 to provide location information at the reporting frequencies described above with respect one or more of 310, 314, 318, 324, and 332 by actively changing a current reporting frequency of the location sensor 130 based at least in part on a size (e.g., a radius, a perimeter, etc.) of a geofence associated with the paving system 100 (e.g., the geofence 230), the location of the geofence with respect to the worksite 112, the location of the geofence with respect to the paving material plant 102, the location of the geofence with respect to a dumpsite 240 and/or other location of interest, the location of the geofence with respect to the paving machine 106, one or more of the compaction machines 114, 116, 118, and/or other paving system components, and/or other parameters. In some examples, the system controller 122 may control the location sensor 130 to provide location information at the reporting frequencies described above with respect one or more of 310, 314, 318, 324, and 332 by actively changing a current reporting frequency of the location sensor 130 based at least in part on a distance between a first geofence (e.g., the geofence 230) and a second geofence (e.g., the geofence 222, the geofence 224, the geofence 242, etc.).

With continued reference to FIG. 3, it is understood that the additional location information received by the system controller 122 at 332, at the fifth reporting frequency, may identify and/or otherwise indicate one or more additional locations of the haul truck 104. For example, the additional location information received by the system controller 122 at 332 may identify and/or otherwise indicate one or more additional locations of the haul truck 104 (e.g., a location E) along the travel path 208. In such examples, at 334 the system controller 122 may determine, based at least in part on the additional location information received at 332, whether the location E of the haul truck 104 is within the first geofence described above with respect to 326 (e.g., the geofence 230) and within a second geofence of the paving system 100. Such a second geofence may comprise, for example, the geofence 222 disposed at least in part within the geofence 230. For instance, as described above, the geofence 222 may substantially overlay at least part of a perimeter of the paving machine 106 and may be generated by the location sensor 130 disposed on the paving machine 106. In such examples, the geofence 222 may be disposed within the geofence 230, and in some examples the geofence 222 may be substantially concentric with the geofence 230. In such examples, at 334 the system controller 122 may determine whether the location E of the haul truck 104 along the segment 234 of the travel path 208 is at a distance less than the radius $R_1$ from the paving machine 106 and/or from the location sensor 130 carried by the paving machine 106.

In such examples, if at 334 the system controller 122 determines that the location E of the haul truck 104 is not within the first geofence 230 and the second geofence 222 (334—No), at 336 the system controller 122 may control the location sensor 130 to maintain the current reporting frequency modification pattern effected at 332. For example, if at 334 the system controller 122 determines that the haul truck 104 is disposed at a location along the segment 234 that is within the geofence 230 but outside of the geofence 222 as the haul truck 104 is approaching the paving machine 106, the system controller 122 may control the location sensor 130 to continue increasing its reporting frequency in a substantially stepwise manner, at a constant rate, a variable rate, a predetermined rate (e.g., constant or variable), at a rate that is determined in substantially real-time, and/or in any other manner described above with respect to 332. Continuing to increase the reporting frequency of the location sensor 130 in this way at 336 may, in time, result in the system controller 122 controlling the location sensor 130 to provide additional location information, at 336, at the fifth reporting frequency selected at 332. At 338, the system controller 122 may receive the additional location information provided at 336, and such additional location information may identify and/or may be indicative of one or more additional locations of the haul truck 104 along the travel path 208 (e.g., along the segment 234). The system controller 122 may then proceed to 334.

If, on the other hand, at 334 the system controller 122 determines that the current location of the haul truck 104 (e.g., location E) is within the geofence 230 and is within the geofence 222 (334—Yes), at 340 the system controller 122 may control the location sensor 130 to maintain the fifth reporting frequency or to change its reporting frequency substantially instantaneously (e.g., in a binary fashion as described above) to the fifth reporting frequency selected at 332. For instance, determining, at 334, that a current location E of the haul truck 104 is within the geofence 230 and within the geofence 222 may indicate that the location of the haul truck 104 should be determined with relatively high frequency and/or accuracy. As a result, if the location sensor 130 is not already providing location information at the fifth frequency selected at 332, at 334 the system controller 122 may substantially instantaneously increase the reporting frequency of the location sensor 130 to the fifth reporting frequency as the haul truck 104 enters the geofence 222. In such examples, and based at least in part on the determination made at 334, at 340 the system controller 122 may control the location sensor 130 located on the haul truck 104 to provide additional location information, via the network 124, at the fifth reporting frequency.

At 342, the system controller 122 may receive additional location information from the location sensor 130, via the network 124, at the fifth reporting frequency. The additional location information received by the system controller 122 at 342, at the fifth reporting frequency, may identify and/or otherwise indicate one or more additional locations of the haul truck 104. For example, the additional location information received by the system controller 122 at 342 may identify and/or otherwise indicate a location F of the haul truck 104 along the travel path 208. In such examples, at 344 the system controller 122 may determine, based at least in part on the location information received at 342, whether the location F of the haul truck 104 is outside of the geofence 230 described above and associated with the paving machine 106. For example, at 344 the system controller 122 may determine whether the location F of the haul truck 104 along the segment 236 of the travel path 208 is at a distance greater than the radius $R_2$ from the paving machine 106 and/or from the location sensor 130 carried by the paving machine 106.

In such examples, if at 344 the system controller 122 determines that the location F of the haul truck 104 is not outside of the geofence 230 (344—No), the system controller 122 may control the location sensor 130 to maintain the fifth reporting frequency described above with respect to 332 and 340. For example, at 342 the system controller 122 may control the location sensor 130 to provide additional location information at the fifth reporting frequency. At 342, the system controller 122 may also receive such the additional location information, and such additional location information may identify and/or may be indicative of one or more additional locations of the haul truck 104 along the travel path 208. The system controller 122 may then proceed to 344.

If, on the other hand, at 344 the system controller 122 determines that a current location of the haul truck 104 (e.g., the location G) is outside of the geofence 230, and thus outside of the geofence 222 (344—Yes), at 346 the system controller 122 may determine and/or select an additional reporting frequency (e.g., a sixth reporting frequency) less than the fifth reporting frequency described above with respect to 332 and 340. For instance, determining, at 344, that a current location G of the haul truck 104 is outside of the geofence 230 may indicate that the location of the haul truck 104 may be determined with relatively less frequency and/or accuracy in order to conserve network bandwidth, memory associated with the system controller 122, processor resource of the system controller 122 and/or other resources of the paving system 102. As a result, at 346 the system controller 122 may decrease the reporting frequency from the fifth reporting frequency to the sixth reporting frequency as the haul truck 104 exits the geofence 230, and/or approaches the exit 214 of the worksite 112. In such examples, and based at least in part on the determination made at 344, at 346 the system controller 122 may control the location sensor 130 located on the haul truck 104 to provide additional location information, via the network 124, at the sixth reporting frequency, and in some examples the sixth reporting frequency may be substantially equal to the first reporting frequency described above with respect to at least 304. In other examples, the sixth reporting frequency may be substantially equal to one of the second, third, or fourth reporting frequencies described above with respect to 310, 314, and 318, respectively. Accordingly, at 346, the system controller 122 may receive additional location information from the location sensor 130, via the network 124, at the sixth reporting frequency.

It is understood that, in any of the examples described herein, controlling the location sensor 130 to provide additional location information at the sixth reporting frequency at 346 may include decreasing a reporting frequency of the location sensor 130. For example, controlling the location sensor 130 in this way at 346 may include decreasing the reporting frequency of the location sensor 130, from the fifth reporting frequency to the sixth reporting frequency, based at least in part on a size (e.g., a radius, perimeter, etc.), shape, location, and/or other configuration of the geofence 230, one or more previous decreases in the reporting frequency of the location sensor 130, a distance between the geofence 230 and one or more additional geofences associated with the paving system 100 (e.g., the geofence 242 associated with the dumpsite 240), and/or other parameters. In some examples, controlling the location sensor 130 in this way at 346 may include decreasing the reporting frequency of the location sensor 130, from the fifth reporting frequency to the sixth reporting frequency, based at least in part on a distance between the geofence 230 and an additional geofence (e.g., the geofence 242) disposed remote from the worksite 112.

In further examples, controlling the location sensor 130 to provide additional location information at the sixth reporting frequency at 346 may include decreasing the reporting frequency of the location sensor 130, from the fifth reporting frequency to the sixth reporting frequency, based at least in part on a distance between the haul truck 104 and the geofence 230, an elapsed time during which the haul truck 104 is disposed outside of the geofence 230, a speed at which the haul truck 104 exits the geofence 230 along the travel path 208, and/or other parameters associated with the haul truck 100 for exiting the geofence 230.

As shown in FIG. 3, at 348 the system controller 122 may return to 306, and upon returning to 306, the system controller 122 may continue to receive additional location information at the sixth reporting frequency selected at 346. Control may continue in accordance with the method 300 as the haul truck 104 traverses a remainder of the travel path 208 extending from the worksite 112 to the paving material plant 102. For example, the method 300 may govern one or more changes in the reporting frequency of the location sensor as the haul truck passes into and out of one or more additional geofences (e.g., the geofence 342 associated with the dumpsite 240) disposed at least partly along the travel path 208 at locations between the exit 214 of the worksite 112 and the entrance 202 of the paving material plant 102.

INDUSTRIAL APPLICABILITY

The present disclosure describes systems and methods for actively modifying and/or otherwise controlling the frequency within which one or more location sensors 130 of a paving system 100 provide location information to a remote system controller 122 of the paving system 100. Such systems and methods may be used to more efficiently coordinate the activities of one or more haul trucks 104, paving machines 106, compaction machines 114, 116, 118, and/or other machines or equipment of the paving system 100.

In particular, such systems and methods may be configured to reduce the reporting frequency of such location sensors 130 at times during which the exact location of a haul truck 104 is of relatively low importance. Such systems and methods may also be configured to actively increase the reporting frequency of such location sensors 130 at times during which the exact location of the haul truck 104 is of relatively high importance. For instance, the systems and methods of the present disclosure may be configured to reduce a reporting frequency of a location sensor 130 carried by the haul truck 104 while the haul truck 104 is traveling along a travel path at one or more locations relatively far from the worksite 112 and/or relatively far from one or more geofences associated with the worksite 112. In some examples, the systems and methods of the present disclosure may reduce the reporting frequency based at least in part on one or more factors including a distance between the current location of the haul truck 104 and a geofence of the worksite 112, an expected travel time associated with the haul truck 104 traveling to the worksite 112, a speed of the haul truck, traffic associated with the travel path 208, weather conditions, road conditions, and/or other dynamic parameters.

The systems and methods of the present disclosure may also be configured to increase the reporting frequency of the location sensor 130 carried by the haul truck 104 when the haul truck 104 is traveling along the travel path 208 at one or more additional locations relatively close to the worksite 112. In some cases, the systems and methods of the present disclosure may be configured to increase the reporting frequency of the location sensor 130 when the haul truck 104 is traveling along the travel path 208 at one or more additional locations relatively close to and/or within a geofence 230 associated with the worksite. For example, the systems and methods of the present disclosure may increase the reporting frequency of the location sensor 130 to a first reporting frequency when the haul truck 104 is disposed at a distance from the geofence 230 less than or equal to a threshold distance. The systems and methods of the present disclosure may further increase the reporting frequency of the location sensor 130 to a second reporting frequency, greater than the first reporting frequency, when the haul truck 104 is disposed within the geofence 230.

As a result, the systems and methods of the present disclosure minimize the collection, transmission, and processing of relatively unimportant location information, while maximizing the collection, transmission, and use of highly important location information. As a result, network bandwidth, processor resources, memory, and/other resources of the control system 120 are utilized with increased efficiency. Further, managing the delivery of paving material to the worksite 112 effectively can minimize and/or substantially eliminate paving machine stoppages during the paving process. As a result, the consistency and/or quality of the mat of paving material 108 may be maximized. Additionally, time and other human resources may be managed more effectively through the use of the techniques described herein, thereby creating the opportunity to reduce downtime and further reduce operating costs.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method, comprising:
    receiving first location information, at a first reporting frequency, with a controller, the first location information being generated by a location sensor and indicating a first location of a paving system component;
    determining that a distance between a second location of the paving system component and a first geofence is less than or equal to a distance threshold;
    based at least in part on determining that the distance is less than or equal to the distance threshold, controlling the location sensor to provide second location information at the first reporting frequency;
    receiving third location information, at the first reporting frequency, with the controller, the third location information being generated by the location sensor and indicating a third location of the paving system component;
    determining, based at least in part on the third location information, that the third location of the paving system component is within the first geofence; and
    based at least in part on determining that the third location is within the first geofence, controlling the location sensor to provide fourth location information at a second reporting frequency greater than the first reporting frequency.

2. The method of claim 1, wherein the paving system component comprises a haul truck configured to transport paving material from a paving material plant to a worksite, and the location sensor comprises a global positioning device located on the haul truck.

3. The method of claim 1, wherein the first location and the second location comprise locations along a travel path extending from a paving material plant to a worksite, and wherein the first geofence comprises a geofence substantially surrounding a paving machine disposed at the worksite.

4. The method of claim 1, further including controlling the location sensor to provide the fourth location information at the second reporting frequency in accordance with a plurality of incremental step changes.

5. The method of claim 1, further including controlling the location sensor to provide the fourth location information at the second reporting frequency based at least in part on a size of the first geofence.

6. The method of claim 1, further comprising:
    receiving the fourth location information, at the second reporting frequency, with the controller, the fourth location information indicating a fourth location of the paving system component;
    determining, based at least in part on the fourth location information, that the fourth location is within a second geofence disposed at least in part within the first geofence; and
    based at least in part on determining that the fourth location is within the second geofence, controlling the location sensor to provide fifth location information at the second reporting frequency.

7. The method of claim 6, further comprising:
receiving the fifth location information, at the second reporting frequency, with the controller, the fifth location information indicating a sixth location of the paving system component;
determining, based at least in part on the fifth location information, that the sixth location is outside of the first geofence and outside of the second geofence; and
based at least in part on determining that the sixth location is outside of the first geofence and outside of the second geofence, controlling the location sensor to provide sixth location information at a third reporting frequency less than the second reporting frequency.

8. The method of claim 7, further including controlling the location sensor to provide the sixth location information at the third reporting frequency based at least in part on a size of the first geofence, a previous decrease in a reporting frequency of the location sensor, or a distance between the first geofence and a third geofence, the first geofence being disposed at a worksite and the third geofence being disposed remote from the worksite.

9. The method of claim 7, further including controlling the location sensor to provide the sixth location information at the third reporting frequency based at least in part on a distance between the paving system component and the first geofence, or an elapsed time during which the paving system component is disposed outside of the first geofence.

10. The method of claim 1, further comprising:
determining, based at least in part on the first location information, a fourth location of the paving system component;
determining at least one of:
an additional distance between the fourth location and the first geofence exceeds an additional distance threshold,
an expected travel time associated with the paving system component traveling from the fourth location to the first geofence exceeds a time threshold, or
a speed of the paving system component at the fourth location exceeds a speed threshold; and
controlling the location sensor to provide fifth location information at a third reporting frequency less than the first reporting frequency based at least in part on determining the at least one of:
the additional distance exceeds the additional distance threshold, the expected travel time exceeds the time threshold, or the speed exceeds the speed threshold.

11. A method, comprising:
selecting, with a controller, a first reporting frequency of a location sensor disposed on a haul truck;
receiving first location information, at the first reporting frequency, with the controller, the first location information being generated by the location sensor and indicating a first location of the haul truck, wherein the first location is disposed along a travel path extending from a paving material plant to a worksite remote from the paving material plant;
selecting, with the controller, a second reporting frequency of the location sensor based on at least one of a first distance between the first location and a first geofence associated with the worksite, an expected travel time associated with the haul truck traveling from the first location to the first geofence, or a speed of the haul truck at the first location, the second reporting frequency being less than the first reporting frequency;
receiving second location information, at the second reporting frequency, with the controller, the second location information being generated by the location sensor and indicating a second location of the haul truck along the travel path,
wherein a second distance between the second location and the first geofence is less than or equal to a distance threshold;
controlling the location sensor to provide third location information at the first reporting frequency based at least in part on the second distance;
receiving the third location information, at the first reporting frequency, with the controller, the third location information being generated by the location sensor and indicating a third location of the haul truck,
wherein the third location of the haul truck is within the first geofence; and
based at least in part on the third location, controlling the location sensor to provide fourth location information at a third reporting frequency greater than the first reporting frequency.

12. The method of claim 11, wherein:
the controller is disposed remote from the worksite,
the controller is in communication with a network, and
at least one of the first location information, the second location information, or the third location information is received via a network.

13. The method of claim 11, wherein the location sensor comprises a first location sensor, and the first geofence is generated by a second location sensor disposed on a paving machine at the worksite, the method further comprising:
receiving fourth location information, at the third reporting frequency, with the controller, the fourth location information indicating a fourth location of the haul truck, wherein the fourth location of the haul truck is within a second geofence disposed at least in part within the first geofence and generated by the second location sensor; and
based at least in part on the fourth location, controlling the first location sensor to provide fifth location information at the third reporting frequency.

14. The method of claim 13, further comprising:
receiving the fifth location information, at the third reporting frequency, with the controller, the fifth location information indicating a sixth location of the haul truck, wherein the sixth location of the haul truck is outside of the first geofence and outside of the second geofence; and
based at least in part on the sixth location, controlling the location sensor to provide sixth location information at a fourth reporting frequency less than the third reporting frequency.

15. The method of claim 14, further including controlling the first location sensor to provide the sixth location information at the fourth reporting frequency based at least in part on a size of the first geofence, a previous decrease in a reporting frequency of the first location sensor, or a distance between the first geofence and a third geofence disposed remote from the worksite.

16. A paving system, comprising:
a controller;
a haul truck configured to transport paving material from a paving material plant to a worksite remote from the paving material plant;

a location sensor disposed on the haul truck and configured to determine a location of the haul truck, wherein the location sensor is in communication with the controller via a network; and a paving machine disposed at the worksite and configured to receive paving material from the haul truck, wherein the controller is configured to:

receive first location information, via the network and at a first reporting frequency, from the location sensor, the first location information indicating a first location of the haul truck, wherein the first location is disposed along a travel path extending from the paving material plant to the worksite;

select a second reporting frequency of the location sensor, wherein the second reporting frequency is based at least in part on at least one of a first distance between the first location and a first geofence associated with the worksite, an expected travel time associated with the haul truck traveling from the first location to the first geofence, or a speed of the haul truck at the first location, the second reporting frequency being less than the first reporting frequency;

control the location sensor to provide second location information at the second reporting frequency;

receive the second location information, via the network and at the second reporting frequency, from the location sensor, the second location information indicating a second location of the haul truck along the travel path, wherein a second distance between the second location and the first geofence is less than or equal to a distance threshold;

control the location sensor to provide third location information at the first reporting frequency based at least in part on the second distance;

receive the third location information, via the network and at the first reporting frequency, from the location sensor, the third location information indicating a third location of the haul truck, wherein the third location of the haul truck is within the first geofence; and based at least in part on the third location, control the location sensor to provide fourth location information at a third reporting frequency greater than the first reporting frequency.

17. The paving system of claim 16, wherein:
the location sensor comprises a first location sensor,
the first geofence comprises a geofence substantially surrounding a paving machine disposed at the worksite,
the first geofence is generated by a second location sensor disposed on the paving machine, and
the second location sensor is configured to generate a second geofence disposed at least in part within the first geofence.

18. The paving system of claim 17, wherein the controller is further configured to:
receive fourth location information, via the network and at the third reporting frequency, the fourth location information indicating a fourth location of the haul truck within the second geofence; and
based at least in part on the fourth location, control the first location sensor to provide fifth location information at the third reporting frequency.

19. The paving system of claim 18, wherein the controller is further configured to:
receive the fifth location information, via the network and at the third reporting frequency, the fifth location information indicating a sixth location of the haul truck, wherein the sixth location of the haul truck is outside of the first geofence and outside of the second geofence; and
based at least in part on the sixth location and an elapsed time associated with the haul truck being disposed outside of the first geofence, control the first location sensor to provide sixth location information at a fourth reporting frequency less than the third reporting frequency.

20. The paving system of claim 16, wherein controlling the location sensor to provide the fourth location information at the third reporting frequency comprises changing a current reporting frequency of the location sensor at a variable rate.

* * * * *